United States Patent [19]

Suda et al.

[11] Patent Number: 5,802,504
[45] Date of Patent: *Sep. 1, 1998

[54] TEXT PREPARING SYSTEM USING KNOWLEDGE BASE AND METHOD THEREFOR

[75] Inventors: Aruna Rohra Suda; Suresh Jeyachandran, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 492,930

[22] Filed: Jun. 21, 1995

[30] Foreign Application Priority Data

Jun. 21, 1994 [JP] Japan .................... 6-138879
Jun. 21, 1994 [JP] Japan .................... 6-138887

[51] Int. Cl.$^6$ .................................................. G06F 15/18
[52] U.S. Cl. ........................... 706/11; 706/45; 706/47
[58] Field of Search .................. 395/10–13, 50–51, 395/60–61, 338, 772, 605, 54

[56] References Cited

U.S. PATENT DOCUMENTS 5,280,573  1/1994  Kuga et al. ................. 395/338
5,282,265  1/1994  Suda et al. ................... 395/12
5,297,039  3/1994  Kanaegami et al. ........... 395/605
5,390,281  2/1995  Luciw et al. .................. 395/12

FOREIGN PATENT DOCUMENTS 0361366   4/1990  European Pat. Off. ........ G06F 15/20
63-008858 1/1988  Japan .
02297162 12/1990  Japan .

OTHER PUBLICATIONS

"Survey of Expert Critiquing Systems: Practical and Theoretical Frontiers" by B.G. Silverman; 8070 Communication of the ACM 35(1992) Apr., No. 4, N.Y. USA; pp. 106–127.

Primary Examiner—Tariq R. Hafiz
Attorney, Agent, or Firm—Fitzpatrick, Cella, Harper & Scinto

[57] ABSTRACT

System and method for preparing a text by using a knowledge base, by which knowledge relating to input information is first retrieved from the knowledge base. Then, a plurality of kinds of information used as elements of a text to be generated is selected from the input information and the retrieved information relating thereto. Subsequently, a describing order, in which the selected elements of the text are described, is determined. Then, a text to be outputted is generated on the basis of the selected elements of the text, the describing order of which has been determined. Thereby, a text, whose contents and structure meet a user's purpose, is generated from the input simple information.

58 Claims, 66 Drawing Sheets

FIG. 8 a) INPUT : "I would like to meet you"

OUTPUT : WANT { Actor : PERSON (Aruna Rohra)

Object : MEET {

Actor : PERSON (Aruna Rohra)

Object : PERSON (John Smith)

...

Tense : Present form}

...

Tense : Future form

} b) INPUT : "I am coming to USA in April.     (1)

Hence I would like to meet you after 10th"     (2)

OUTPUT : PTRANS {···}     (for (1))

WANT {···

Object : MEET {···}}     (for (2))

⇩

WANT {···

Object : MEET {···

Connected_to : (PTRANS {···}, REASON)}} c) INPUT : "reserve accommodation and pick up"

OUTPUT : AGREEMENT {Actor :

...

Connected_to : (MEET {···}, AND_REL)}

⇩

AGREEMENT {···}

MEET {···}

FIG. 22

Physical Objects

Abstract Entities

Space (Place)

Time (Events)

Driving Forces (e.g., Themes, Goals-Plans, Mops, Scenes)

Results of Driving Forces or Actions

State Descriptors

FIG. 24

PERSON

- has a Name

- has Age, Telephone, Sex, Date of Birth

- has an Address

- has Themes

- has Social level

- belongs to Organization (s)

- does Work (s) on

- performs Function (s) of

Example : PERSON

Name = John Smith

Age = 38

Telephone = +1-212-779-8923

Sex = M

Date of Birth = 01/27/1955

Address = University of Rochester, New York, U.S.A

Has Theme = {Do_ Research, ···}

Social Level = 3

Organisation = University of Rochester, ···

Work = Lens Design, ···

Function = Professor, ···

FIG. 26

ORGANIZATION

– has a Name

– belongs to Higher organization

– owns Sub organization (s) or Division (s)

– has Persons working on Work _domain

– number of Persons

– Type of organization

– has an Address

– has a Nominal head

– has a Representative head

Example :

Name = School of Engineering and Sciences

Belongs to = University of Rochester

Owns = {Deoartment of Physics, Computer Science,

{Person = John Smith,

Work = Lens Design, ···}, ···}

Address = University of Rochester, New York, U.S.A

No. of Persons = 30

Type of Organization = University

FIG. 28

PLACE

- has a Name

- owns Places

- belongs to Places

- has Population

- has Persons

- occupies Area

Example of COUNTRY :

Name = Japan

Owns = {Tokyo, Osaka, Yokohama, Fukuoka, ···}

Belongs to = Asia

Population = ···

Persons = ···

Area = ···

FIG. 30

UNIT_TIME
- owns Unit_time
- belongs to Unit_time
- has a Count
- has a Qualifier TIME
- has Second
- has Minute
- has Hour
- has Day
- has Day part
- has Week
- has Week part
- has Month
- has Month part
- has Year
- has Year part FIG. 32
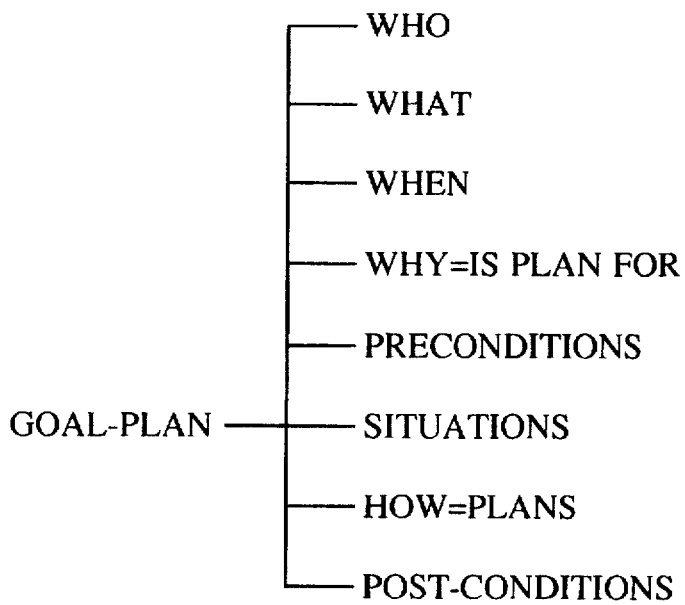
Example :
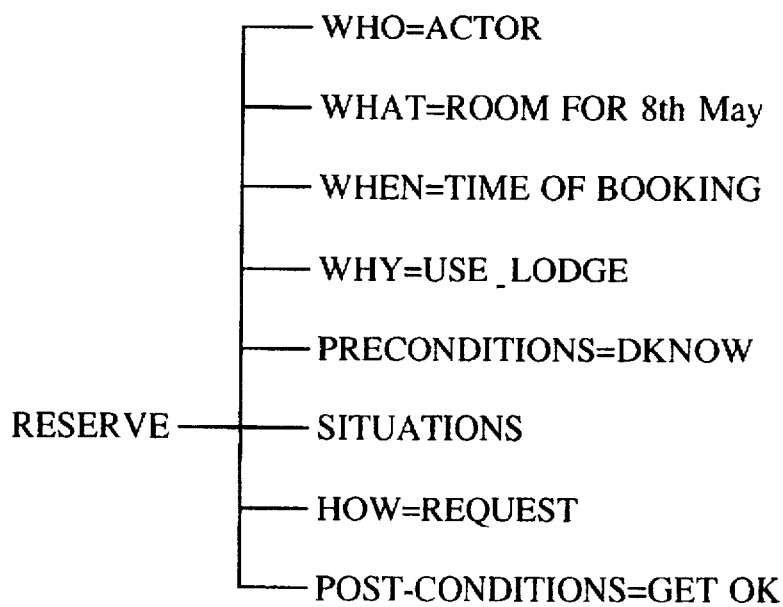

FIG. 33
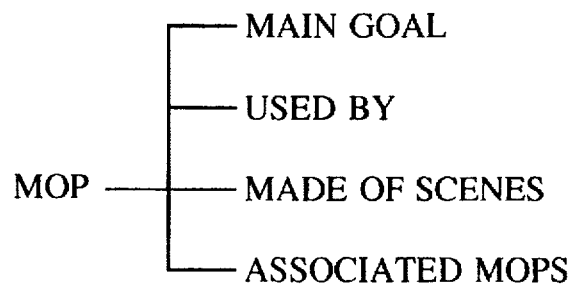
Example :
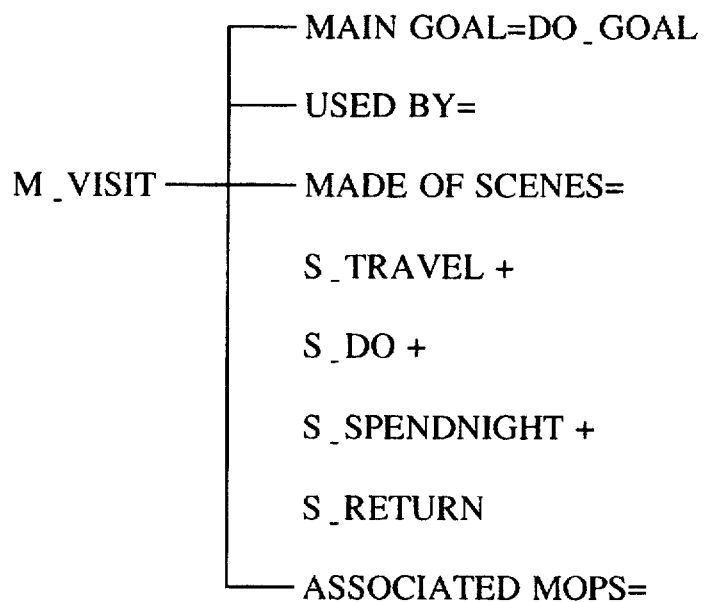

FIG. 34
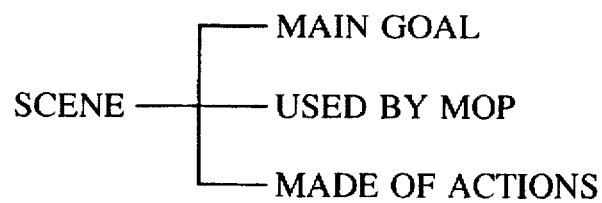
Example :
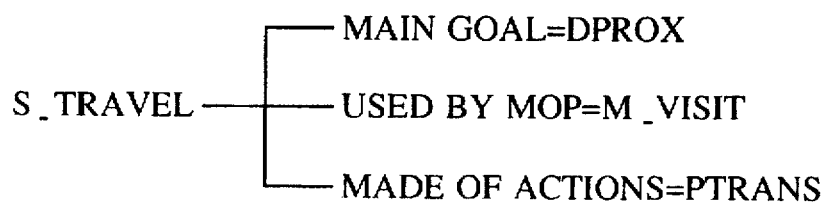

FIG. 36

| E.g., Domain | R&D | Sales |
|---|---|---|

M_KEEP_ABREAST

| | R&D | Sales |
|---|---|---|
| S_PREP | decide area | decide broad area |
| S_DO | read/discuss | market survey/discuss |
| S_POST | summarize | report |

M_DO_WORK

| | R&D | Sales |
|---|---|---|
| S_PREP | choose theory | choose product |
| S_DO | modify/experiment | sell |
| S_POST | integrate results | make profit |

M_GET_EVALUATED

| | R&D | Sales |
|---|---|---|
| S_PREP | choose technique | choose feedback method |
| S_DO | present/publish | consumer feedback |
| S_POST | integrate feedback | improve product |

FIG. 38

Goals-Plans: DKNOW, DPOSSESS, DPROX
SPEND_NIGHT,
REQUEST,
DO_GOAL, ASK, ATTEND_CONF,
G_PTRANS, USE_VEHICLE, PESERVE_VEHICLE,
RESERVE_LODGE, USE_LODGE,
PB_USETOOL, PB_INTERACT, PB_ATTEND,···

MOPS: M_VISIT, M_MEET,···

SCENES: S_WRITE, S_REQUEST, S_DO
S_TRAVEL, S_SPENDNIGHT, S_RETURN,
S_PREPN, S_USE_VEHICLE, S_SETTLEMENT,
S_CHECKIN, S_USE_LODGE, S_CHECKOUT,···

FIG. 40

ACTION/AD

| SLOTNAME | KNOWLEDGE STRUCTURE |
|---|---|
| has an Actor | Person/Animate |
| has an Object | |
| has an Instrument | Person/Physical Object |
| has an Iobject - Beneficiary | Person |
|           - Reason | Person |
|           - Direction | Place |
|           - Via | Person/Place |
| has a From | Place/Person |
| has a Support | Place/Organization |
| has a Time | |
| has a Connected To | |
| has a Tense | |
| has a Qualifier | (Adverbs) |

Example : PTRANS

| | |
|---|---|
| Actor | (PERSON (John Smith)) |
| Object | |
| Instrument | (FLIGHT (No. UA201)) |
| Iobj - Direction | (CITY (Tokyo)) |
| From | (CITY (New York)) |
| Support | ... |
| Time | (September 27, 1993) |
| Tense | ... |
| ... | |

FIG. 42(a)

DOCUMENT PREPARATION RULES FOR TECHNICAL REPORT

1. Background (from previous report/Work)
2. Aim (list main points from results)
3. Results (refine & make coherent the input given by user)
4. Conclusions/Summary (list point wise from above)
5. Appendices (if any mentioned in results or ask user)
6. References
7. Enclosures (if any mentioned in results or ask user)

FIG. 42(b)

DOCUMENT PREPARATION RULES FOR LETTER

1. Introduction and Greetings
2. State main goal
3. State main plan
4. State other subgoals and their plans (if any)
5. Closing Statement
6. Closing Remark

FIG. 43

RULE FOR DESCRIBING INTRODUCTORY PART
IN CASE OF FIRST LETTER
  WHEN WRITING LETTER TO UNKNOWN PERSON
    if no WORK of Receiver→State Work_ domain/Project else MATCH WORK (sender & receiver)

| Work_domain matched | Project matched | Knowledge_domain matched | None matched |
|---|---|---|---|
| express Project | express Sub_project | express Project | express Knowledge_domain |

WHEN WRITING LETTER TO KNOWN PERSON if Last corresponded is more than 1 year then state
    * "Long time since I communicated with you"
    * If Change in work of Sender then mention current Work
    * Enquire about Receiver's Work if Last corresponder is less than 1 year but greater than
  3 months then state
    * "It is some time since I last wrote to you" or
    * Greeting if Last corresponded is less than 3 months then state
    * Greeting

IN CASE WHERE LETTER IS NOT FIRST ONE

Get details of mode of communication, date of receipt, date
  of sending···
    if date of receipt is more than 2 weeks+date of sending then state
      * "This is with reference to your letter dated···which
        I received only on···"

if mode is fax, suppress mention of date of receipt if replying 2 Weeks after date of receipt then state
      * "Sorry for the delay in replying to your letter"

if reply received within 2 Weeks of the letter sent then state
      * "Thank you for your quick response"

FIG. 44

RULE FOR DESCRIBING MAIN GOAL
  * State the purpose (main goal) of the letter
  e.g., I would like to have an opportunity to discuss about Interprocess Communication with you RULES FOR DESCRIBING MAIN PLAN
  * State the plan as to how the main goal is proposed to be satisfied

* In case of fixapp, time of appointment is checked before selecting scripts. If time is fixed (at least to day level), we can assume Low priority, otherwise High.

High priority
     Add the reason for scheduling this visit at this time
     e.g., As I shall be coming to <vicinity> to attend AAAI Annual Meeting in April, I would like to take this opportunity to meet you, if possible.
  Low priority
     Add the reason and combine it with fixapp request
     e.g., It so happens that I am coming···and shall be grateful if I could visit you on···
  Note : The reason is added only if Sender & Receiver are in different cities.
     Further,
     if they are in different Countries,
        <vicinity> becomes Receiver's Country if they are in the same Country,
        <vicinity> becomes Receiver's City RULE FOR DESCRIBING PRECONDITION FOR MAIN PLAN
  Statement of Fix appointment is made.

RULE FOR DESCRIBING SUB-GOAL
  State other sub goals if any
  e.g., I would also like to see your labs and facilities.

RULE FOR DESCRIBING OTHER PARTS OF MAIN PLAN
  State Plan(s) and Precondition(s) of other parts of M_VISIT, taking care to suppress statements not explicitly stated by the user.
  e.g., S_SPENDNIGHT
     - Kindly arrange for my accommodation
     - Is prepayment or some sort of advance money required for the above.

FIG. 45

RULES FOR CLOSING STATEMENT
  if letter on behalf then state
    * "With best regards"

if first time - fixapp letter
    if UNKNOWN Receiver then state
      * "Looking forward to hearing from you"
    else state
      * "Looking forward to meeting you"

if second time - confirming appointment letter then state
    * "Once again, looking forward to meeting you"

if request information letter then state
    * "Thanking you in advance"

else state
    * "Thanking you"

RULE FOR CLOSING REMARK
  Depending on the social - level difference, familiarity and other factors between Sender and Receiver, select from
    * "yours sincerely"
    * "yours faithfully"
    * "yours affectionately"
    * "yours obediently"

FIG. 46

| | Word | Concept | | Conditions/Rules |
|---|---|---|---|---|
| VERB | | | | |
| | come | PTRANS | Actor | -ANIMATE |
| | | | Object | - |
| | | | Instrument | -ACTION/VEHICLE |
| | | | Iobj-Reason | -ACTION |
| | | | Iobj-Via | -PLACE |
| | | | Iobj-Direction | -} Vicinity |
| | | | or | } of |
| | | | Support | -} Listener |
| | meet | MEET | Actor | -PERSON |
| | | | Object | -PERSON |
| | | | Support | -Event or Building or M_Place |
| | | | Iobj Reason | -ACTION |
| | | | Time | |
| | discuss | MTRANS | Actor | -PERSON |
| | | | Object | -Sub_Mtrans Noun or M_Build Noun or M_Build Nounform or Mact Object or Action or Sub Mact Object |
| | | | Iobj Beneficiary | -PERSON |
| | | | Iobj Via | -Nil |
| | | | Instrument | -COMMUNICATION |
| | | | From | -Nil |
| | | | Support | -Event or Building or M_Place |
| | | | Time | |
| | reserve | AGREEMENT | Actor | -PERSON |
| | | | Object | -ACCOMMODATION or TICKET or BUILDING |
| | | | Iobj Beneficiary | -PERSON |
| | | | Iobj Reason | -ACTION |
| | | | Time | |
| | see | MEET | ... | |
| | | | Object | :Person |
| | | MSENSE | ... | |
| | | | Object | :Building/Organization |
| NOUNS | | | | |
| | car | SMALL VEHICLE | | private, no. of persons≦5 |
| | taxi | SMALL VEHICLE | | public, no. of persons≦5 |
| | bike | SMALL VEHICLE | | private, no. of persons≦2 |
| | book | PUBLIC-DOCUMENT | | not periodical, few authors, one topic |
| | newspaper | PUBLIC-DOCUMENT | | daily, general topic |
| | dollar | CASH | | country=USA |
| | may | MONTH AUXILLARY VERB | | 5th in the Year |

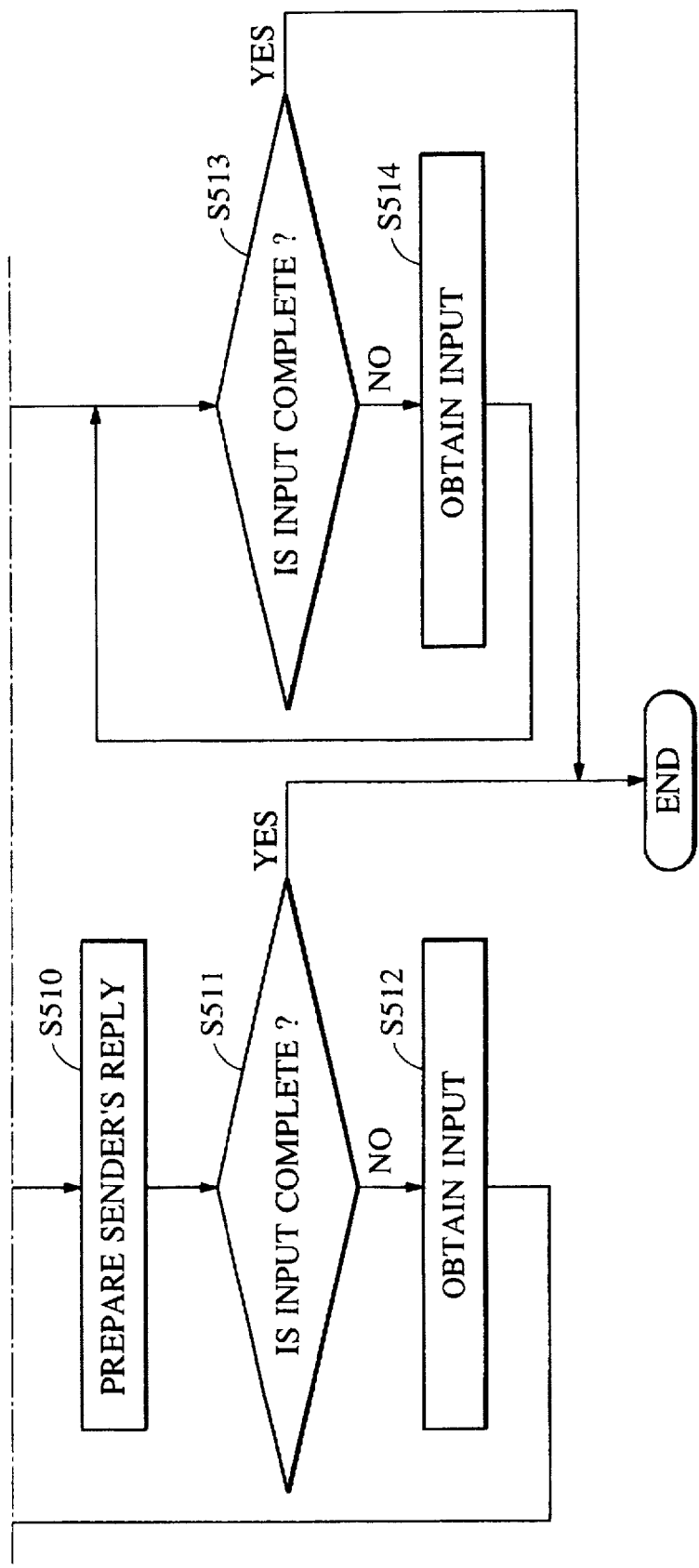

FIG. 48

INPUT:meet John at Duke on 7th after the IJCAI conference to discuss on LWS. reserve accommodation.

OUTPUTS OF CA:C1, C2, C3, C4 and C5

C1-MEET    {Actor          :?PERSON
                 Object        :PERSON(John)
                 Iobj Reason:C11→MTRANS
                 Support      :ORGANIZATION(DUKE), ?PLACE, ?EVENT
                 Time         :(on 7th)
                 Tense        :Present form}

C11-MTRANS{Actor        :?PERSON
                 Object         :?Sub_Mtrans Noun  or ?M_Build Noun or
                                    ?M_Build Nounform  or ?Mact Object or
                                    ?ACTION          or ?Sub Mact Object
                 Iobj_reason:?ACTION
                 Iobj Beneficiary :?PERSON
                 Iobj Via        :Nil
                 Support      :ORGANIZATION(DUKE), ?PLACE, ?EVENT
                 Instrument :?COMMUNICATION
                 Time         :
                 Tense        :Present form}

C2-UNKNOWN NAME(IJCAI)

C3-CONFERENCE

C4-UNKNOWN NAME(LWS)

C5-AGREEMENT{Actor:?PERSON
               Object        :ACCOMMODATION
               Iobj_reason  :?ACTION
               Time          :
               Tense        :Imperative form}

FIG. 49

| S | D | B |
|---|---|---|
| John Smith | | Rochester |
| ... | | ... |
| John Blake | | Wellington |
| ... | | ... |

FIG. 51

AGREEMENT (...

Object      →ACCOMMODATION

Iobj Reason  →?ACTION

...)

after processing by understander becomes →

AGREEMENT (...

Object      →ACCOMMODATION

Iobj Reason  →USE_RESOURCE (...)

MEET→S_DO

MEET→ASK

MEET→M_VISIT or M_MEET

MTRANS (AGREEMENT) →S_WRITE (RESERVE_LODGE)

FIG. 52(b)

S_DO→DO_GOAL→DKNOW (work) → M_KEEP_ABREAST
　　　→DO_WORK→WORK_FOR_EXISTENCE→MENTAL_EXISTENCE
　　　→EXISTENCE (Explained input)

ASK→DKNOW (work) (Tie up to DKNOW, Explained input)

M_VISIT or M_MEET⋯ (Unexplained input)

S_WRITE→REQUEST→RESERVE_LODGE→SPEND_NIGHT→PHYSICAL
　　　EXISTENCE→EXISTENCE (Explained input)

FIG. 56

OUTPUT LETTER

March 15, 1993

Mr. John Smith
Professor
Department of Computer Science
Duke University
Durham, NC-12432
USA Dear Mr. Smith, I am working on Cognitive Science using your theory of learning.
I would like to discuss LWS with you.

Since I am coming to USA for attending the IJCAI conference,
I would like to take this opportunity to meet you, if possible.
I shall be grateful if you can find some time for me on 7th May
93. Kindly reserve accommodation for me to stay in a suitable hotel.

Looking forward to hearing from you, yours sincerely, (Aruna Rohra)
Canon Research Center
5-1, Morinosato - Wakamiya,
Atsugi, 243 - 01
Japan

FIG. 57

INPUT:Reply to John's letter accepting to meet on 10th May 3 pm to discuss on PDA systems.

OUTPUT OF CA:C1

C1 - MTRANS     (reply)

{

Actor :?PERSON

Object:MTRANS→C2

...

}

C2 - MTRANS     (accept)

{

Actor :?PERSON

Object:MEET→C3

...

}

C3 - MEET     (meet to discuss)

{

Actor     :?PERSON

Object     :PERSON (John Smith)

Iobj Reason     :MTRANS

{

Actor     :?PERSON

Object     :(PDA Systems)

...

}

Time     :(on 10th May at 3pm)

SA211. SET_SCENE a) Find actors -

Sender    = Aruna Rohra
        Receiver = John Smith
        Letter    = Reply b) No previous Related context found in Database but context found in the input.

c) Response expected from Sender.

d) Can infer Receiver's letter from Input (i.e., from C3)

SB212. GOAL DETECTION
            C3 = MEET→S_DO, M_VISIT, ASK
                 MEET→(MTRANS)→ASK
        SB213. MAKE INFERENCE
        SB214. PLANNING FOR UNDERSTANDING
        SB215. PLANNING FOR COMPLETION

SB300. TEXT-PREPARATOR
           SB400. GENERATOR e) Construct Sender's Reply from input (i.e., C2)

For AD(s) in the previous letter, i) for S_MAINGOAL, [MTRANS (discuss on PDA systems)]
           1. Acceptable request ii) for S_MAINPLAN, [MEET (MVISIT)]
           1. Accept iii) for S_PLAN       [AGREEMENT (e.g., after 8th May]
           More specific value for TIME may be specified
           by the user→10th May 3 pm SA212. GOAL DETECTION
SA213. MAKE INFERENCE
SA214. PLANNING FOR UNDERSTANDING
SA215. PLANNING FOR COMPLETION

SA300. TEXT - PREPARATOR
SA400. GENERATOR

FIG. 62

Output;

April 15, 1993

Dr. John Smith,

Professor

Department of Computer Science

Duke University

Durham, NC - 12432

USA

Dear Dr. Smith,

This is with reference to your letter dated April 1st.
I shall be glad to have an opportunity to meet you.

We can meet at my office at 3pm on 10th May '93.
Please let me know if this is suitable to you.

Looking forward to meeting you, yours sincerely, (Aruna Rohra)

Research Planning and Administration Division

5 - 1, Morinosato - Wakamiya,

Atsugi, 243 - 01

Japan

FIG. 63

INPUT:Reply to John's letter confirming the meeting time,
19th May at 3 pm. Also, request him to arrange for pickup.

OUTPUTS OF CA:C1, C4

```
C1 - MTRANS                        (reply)
    {
        Actor   : ?PERSON
        Object  : MTRANS→C2
        ...
    }

C2 - MTRANS                        (confirm)
    {
        Actor   : ?PERSON
        Object  : MEET→C3
        ...
    }

C3 - MEET                          (meet)
    {
        Actor   : ?PERSON
        Object  : PERSON (John Smith)
        ...
        Time    : (on 19th May at 3pm)
    }

C4 - MTRANS
    {
        Object  : ARRANGE
                {
                    Actor   : ?PERSON
                    Object  : MEET {...}        (pickup)
                    ...
                }
    }
```

FIG. 64

SA211. SET_SCENE
    a) Find actors-
        Sender   =Aruna Rohra
        Receiver =John Smith
        Letter    =Reply b) Previous Related context found Database
        Found open context-visit after 10th May
        John's letter must be in reply to it.

c) Response expected from Receiver d) Retrieve Previous letter from Database:
        [Date     -04/01/1993
        Intro     -WORK-AD
        Maingoal -MTRANS(discuss)
        Mainplan -MEET(MVISIT)
        Body      -AGREEMENT(after 10th May)
        Close    -]

e) Can infer Receiver's letter
       UNDERSTANDER [B]
         CONSTRUCT REPLY
        For AD's in the previous letter, i) for S_MAINGOAL,     [MTRANS (discuss)]
         1. Acceptable request ii) for S_MAINPLAN,     [MEET (MVISIT)]
         1. Accept Note:(i)&(ii) are inferred from "···confirming the time, 19th May at
           3 pm" i.e., C2&C3.

iii) for S_PLAN         [AGREEMENT (after 10th May)]
        More specific value for TIME specified
           →3.00pm, 19th May 1993
        (from "···confirming the time, 19th May at 3 pm" i.e., C3
           SB212. GOAL DETECTION
           SB213. MAKE INFERENCE
           SB214. PLANNING FOR UNDERSTANDING
           SB215. PLANNING FOR COMPLETION

SB300. TEXT-PREPARATOR
         SB400. GENERATOR f) Can Construct Sender's letter
        CONSTRUCT REPLY
       get reply to AD's of the reconstructed letter
            +
       any additional requests
       (request for pick up from "Also, request him to arrange for pickup")

SA212. GOAL DETECTION
SA213. MAKE INFERENCE
SA214. PLANNING FOR UNDERSTANDING
SA215. PLANNING FOR COMPLETION
SA300. TEXT-PREPARATOR
SA400. GENERATOR

FIG. 65

Output :

April 22, 1993
Dr. John Smith
Professor
Department of Computer Science
Duke University
Durham, NC - 12432
USA Dear Dr. Smith, Thank you for your early reply to my request. I am very grateful to have this opportunity of seeing you personally.

I shall be looking forward to seeing you at 3 pm on 19th May 93. Can you kindly arrange to pick me up ?

Once again, looking forward to meeting you, yours sincerely, (Aruna Rohra)
Research Planning and Administration Division
5 - 1, Morinosato - Wakamiya,
Atsugi, 243 - 01
Japan

FIG. 66

INPUT:Reply to John's letter

OUTPUT OF CA:C1

C1 - MTRANS                 (reply)
        {
          Actor :?PERSON
          Object :LETTER (John)
          ...
    }

SA211. SET_SCENE
    a) Find actors -
        Sender    = Aruna Rohra
        Receiver = John Smith
        Letter    = Reply b) Previous Related context found in Database
        Found open context - visit after 10th May
        Verify from user if John's letter was in reply to it.

c) Response expected from Receiver d) Retrieve Previous letter from Database:
        [Date    -04/01/1993
        Intro    -WORK-AD
        Maingoal -MTRANS (discuss)
        Mainplan -MEET (MVISIT)
        Body    -AGREEMENT (after 10th May)
        Close   -]

e) Can infer Receiver's letter
        Since nothing has been specified in the input, the system
        is not able to infer the Receiver's letter, hence it asks
        the user to input the letter, for e.g., by OCR INPUT THROUGH OCR
        This is with reference to your letter dated 1st April.
        I shall be glad to have an opportunity to meet you.

We can meet at my office at 3 pm on 19th May 93.
        Please let me know if this is suitable to you.

FIG. 67

RECONSTRUCT LETTER from John

For AD's in the previous letter.
  a) for S_MAINGOAL,   [MTRANS(discuss)]
    1. Acceptable request b) for S_MAINPLAN,   [MEET(MVISIT)]
    1. Accept Note: (a)&(b) are inferred from "I shall be glad to have an opportunity to meet you".

c) for S_PLAN       [AGREEMENT(after 10th May)]
    More specific value for TIME
      →3.00 pm. 19th May 1993
    (from "We can meet at my office at 3 pm on 19th May 93")

SB212. GOAL DETECTION
    SB213. MAKE INFERENCE
    SB214. PLANNING FOR UNDERSTANDING
    SB215. PLANNING FOR COMPLETION

SB300. TEXT-PREPARATOR } Reconstructed letter.
    SB400. GENERATOR     } (only for verifying)

f) Can Construct Sender's letter

CONSTRUCT REPLY
      get reply to AD's of the reconstructed letter
         +
    any additional requests (e.g., pick me up)
      from User SA212. GOAL DETECTION
SA213. MAKE INFERENCE
SA214. PLANNING FOR UNDERSTANDING
SA215. PLANNING FOR COMPLETION

SA300. TEXT-PREPARATOR
SA400. GENERATOR

FIG. 68

Output :

April 22, 1993

Dr. John Smith
Professor
Department of Computer Science
Duke University
Durham, NC - 12432
USA Dear Dr. Smith, Thank you for your early reply to my request. I am very grateful to have this opportunity of seeing you personally.

I shall be looking forward to seeing you at 3 pm on 19th May 93. Can you kindly arrange to pick me up ?

Once again, looking forward to meeting you, yours sincerely, (Aruna Rohra)
Research Planning and Administration Division
5 - 1, Morinosato - Wakamiya,
Atsugi, 243 - 01
Japan

FIG. 69

TEXT PREPARATION RULES FOR USER MANUAL OF WORDPROCESSOR
Preface
Table of contents
List of figures
Introduction
 * What's in the package ? (features)
 * Hardware requirements
 * Software requirements
 * Unpacking (Disks)
 * Type faces (icons) used
 * How to contact us ? (Support services)
Installing
 * Procedure
 * Probable errors (Read this before you call us !)
Getting started
 * Feel of the system
 * A short tutorial
 * Basic features
  * File Opening & Saving
  * Editing
  * Printing
Advanced Features
 * Editing
  * Search Operations-seach, replace words
  * Block Operations-copy, move, delete blocks
  * Selection of Fonts, Size,
  * Page format
  * Margin setting, tabs, line spacing
  * Double column
  * Header/Footer
 * Drawing
  * Making boxes, shading
  * Special symbols-mathematical, ···
 * Spell checker
  * Spelling scan/correction
  * Updating user dictionary
  * Thesaurus
 * Printing
  * Page Preview
  * Selecting/Installing Printers
 * Advanced operations
  * Creating mailing labels
  * Mail merging
Appendices
Error Messages
Index Goals-Plans model of word-processing functions

FIG. 71

Input -

How can I change the size and font of the letter to bold and 12 point ?

Output -

Choose Menu Style by CODE S and then choose Option 1 for making it bold. For making it 12 point, choose Menu Size by Code Z and then Choose Option 2.

You can also do this by first making a block of the text you want to change and then using Option 6 (Change style) in the Block Menu. See help on Block menu for more details.

TEXT PREPARING SYSTEM USING KNOWLEDGE BASE AND METHOD THEREFOR

BACKGROUND OF THE INVENTION

1. Field of the Invention

The present invention relates to a text preparing system for preparing a text according to input information and further relates to a method therefor.

2. Description of the Related Art

Hitherto, there has been devised a conventional text preparing system for reading a text from a memory or preparing and outputting a text according to input predetermined commands and data.

The conventional text preparing system, however, has been adapted to output a uniform text correspondingly to the input predetermined commands and data. Therefore, the conventional text preparing system can not output a text whose contents and structure meet requirements for each text, which are set according to a reader's understanding, the difference in social position or rank between the reader and the author of the text, the type of the text and so on.

SUMMARY OF THE INVENTION

Accordingly, an object of the present invention is to provide a text preparing system, by which a text can be prepared just as a user intends, and to provide a text preparing method for such a system.

Further, another object of the present invention is to provide a text preparing system which can infer the intention of a user and can prepare a text according to the inferred intention, and to a text preparing method for such a system.

To achieve the foregoing object, in accordance with an aspect of the present invention, there is provided a text preparing system which comprises input means for inputting information, a knowledge base for storing knowledge therein, retrieval means for retrieving knowledge, which relates to the information inputted by said input means, from said knowledge base, selection means for selecting information, which should be used as an element of a text to be generated, from the information inputted by said input means and the knowledge retrieved by said retrieval means, order determining means for determining a describing order in which the information selected as the element of the text is described, and generating means for generating the text, which should be outputted, from the information which is selected by said selection means and has the describing order determined by said order determining means.

Further, in accordance with another aspect of the present invention, there is provided a text preparing system which comprises input means for inputting information, a knowledge base for storing knowledge therein, understanding means for retrieving knowledge, which relates to the information inputted by said input means, from said knowledge base, for understanding a user's intention and for outputting information which relates to a text to be generated, selection means for selecting information, which should be used as an element of a text to be prepared, from the information outputted by said understanding means, order determining means for determining a describing order in which the information selected by said selection means is described, and generating means for generating the text, which should be outputted, from the information which is selected by said selection means and has the describing order determined by said order determining means.

Moreover, in accordance with still another aspect of the present invention, there is provided a text preparing method which comprises the step of inputting information, the step of retrieving information relating to the inputted information from a knowledge base for storing knowledge, the step of selecting information, which should be used as an element of a text to be generated, from the inputted information and the retrieved knowledge, the step of determining an order in which the selected information is described, and the step of generating a text, which should be outputted, from the information which is selected and has the describing order determined.

Furthermore, in accordance with yet another aspect of the present invention, there is provided a text preparing method which comprises the step of inputting information, the step of understanding a user's intention by retrieving information relating to the inputted information from a knowledge base for storing knowledge, the step of outputting information relating to a text, which should be generated, according to the understood intention, the step of selecting information, which should be used as an element of the text to be generated, from the inputted information and the retrieved knowledge, the step of determining an order in which the selected information is described, and the step of generating a text, which should be outputted, from the information which is selected and has the describing order determined.

Other features, objects and advantages of the present invention will become apparent to those skilled in the art from the following description of a preferred embodiment with reference to the drawings in which like reference characters designate like or corresponding parts throughout several views.

BRIEF DESCRIPTION OF THE DRAWINGS

FIG. 8, which has parts (a), (b) and (c), are diagrams for illustrating objects to be processed by the post-CA and results of the processing performed in the post-CA;

FIG. 22 is a diagram for illustrating primary types of knowledge provided in a physical world knowledge base (hereunder abbreviated as WKB);

FIG. 24 is a diagram for illustrating slots of the knowledge structure of the class "Person" and examples thereof;

FIG. 26 is a diagram for illustrating slots of the knowledge structure of the class "Organization" and examples thereof;

FIG. 28 is a diagram for illustrating slots of the knowledge structure of the class "Place" and examples thereof;

FIG. 30 is a diagram for illustrating slots of the knowledge structure of the classes "Unit_Time" and "Time" and examples thereof;

FIG. 32 is a diagram for illustrating slots of the knowledge structure of the class "Goal-Plan" and examples thereof;

FIG. 33 is a diagram for illustrating slots of the knowledge structure of the class "MOPS" and examples thereof;

FIG. 34 is a diagram for illustrating slots of the knowledge structure of the class "Scene" and examples thereof;

FIG. 36 is a diagram for illustrating examples of the scenes which depend on domains;

FIG. 38 is a diagram for illustrating primary types of goals, plans, MOPS and SCENES used in the case of preparing a letter;

FIG. 40 is a diagram for illustrating the structure of CD and examples thereof;

FIGS. 42(a) and 42(b) are diagrams for illustrating an example of a Text preparation Knowledge Base (hereunder abbreviated as TKB);

FIG. 43 is a diagram for illustrating the detailed rules of the TKB for preparing an introductory-part of a letter;

FIG. 44 is a diagram for illustrating the detailed rules of the TKB for the description of the main goal of the letter, which is performed by the introductory-part preparator, and the processing to be performed by the main-part preparator;

FIG. 45 is a diagram for illustrating the detailed rules of the TKB, which are used for preparing the letter in the closing-part preparator;

FIG. 46 is a diagram for illustrating an example of a Language Knowledge Base (hereunder abbreviated as LKB);

FIG. 48 is a diagram for illustrating an example of a processing to be performed by the CA in the case of preparing the letter;

FIG. 49 is a diagram for illustrating an example of an SDB (Structured Data Base);

FIG. 51 is a diagram for illustrating an example of an inference or reasoning process;

FIGS. 52(a) and 52(b) are diagrams for illustrating an example of another inference process;

FIG. 56 is a diagram for illustrating an example of an output letter;

FIG. 57 is a diagram for illustrating another example of a processing to be performed by the CA in the case of preparing a letter;

FIG. 58 is a diagram for illustrating a process of preparing a letter;

FIG. 62 is a diagram for illustrating another example of an output letter;

FIG. 63 is a diagram for illustrating still another example of a processing performed by the CA in the case of preparing a letter;

FIG. 64 is a diagram for illustrating a process of preparing a letter;

FIG. 65 is a diagram for illustrating still another example of an output letter;

FIG. 66 is a diagram for illustrating yet another example of a processing performed in the case of preparing a letter;

FIG. 67 is a diagram for illustrating a process of reconstructing the received letter;

FIG. 68 is a diagram for illustrating yet another output letter;

FIG. 69 is a diagram for illustrating an example of a text preparation rule for a user manual of word processor;

FIG. 71 is a diagram for illustrating an example of a response made by using a help facility.

DETAILED DESCRIPTION OF THE PREFERRED EMBODIMENT

Hereinafter, the preferred embodiment of the present invention will be described in detail by referring to the accompanying drawings.

Figure 1:
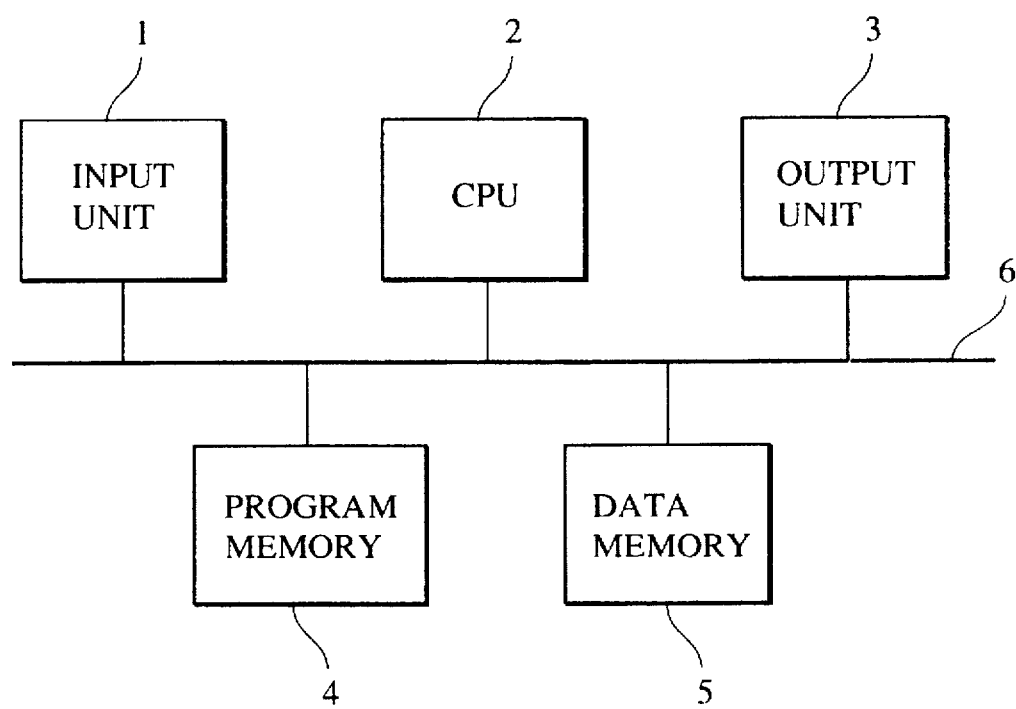
FIG. 1 is a block diagram for illustrating the configuration of the hardware of a natural language processor embodying the present invention, namely, the embodiment of the present invention.

FIG. 1 is a block diagram for illustrating the configuration of the hardware of a text preparing system embodying the present invention, namely, an embodiment of the present invention. This text preparing system is provided with an input unit 1, a CPU (namely, Central Processing Unit) 2, an output unit 3, a program memory 4, a data memory 5 and a bus 6.

The input unit 1 is used to input information represented in a natural language, and, for example, a keyboard for keying characters may be employed as the input unit 1. The input unit 1 is, however, not limited to such a keyboard. Speech or voice input unit including a speech recognition device, an image input unit including a character recognition device, or a receiver-for receiving information from another system may be employed as the input unit 1. Alternatively, two or more of these units may be simultaneously employed as the input unit, and one of the employed units may be selected in such a manner as to actually be used as the input unit. Further, information generated by performing an operation within this system may also be used as input information thereto.

The CPU 2 is operative to perform operations for various processing and make a logical decision or the like. Further, the CPU 2 controls each of the composing elements connected to the bus 6.

The output unit 3 is, for instance, a display device such as a CRT (namely, Cathode Ray Tube) display and a liquid crystal display. In addition, a speech or audio output unit for outputting output information synthesized by performing a speech synthesis, a printer for providing printouts, or a transmitter for transmitting information to other systems may be employed as the output unit 3. Alternatively, two or more of these units may be simultaneously employed as the output unit, and one of the employed units may be selected in such a manner as to actually be used as the output unit. Further, an output of the output unit 3 may be used as input information to another unit of this system.

The program memory 4 is a memory which stores programs to be executed by the CPU 2 so as to perform a control operation including a procedure (to be described later by referring to a flowchart thereof) therein. Either of a ROM (namely, Read-Only Memory) and a RAM (namely, Random Access Memory), to which a program is loaded from an external memory unit or the like, may be employed as the program memory 4.

The data memory 5 stores knowledge contained in a knowledge base (to be described later) in addition to data generated when performing various processings. The data memory is, for example, a RAM. The knowledge contained in the knowledge base is preliminarily loaded from a nonvolatile external storage medium into the data memory 5. Alternatively, the knowledge contained in the knowledge base is referred to, if necessary.

The bus 6 is a bus for transferring an address signal indicating a composing element to be controlled by the CPU 2, a control signal used for controlling each composing element and data to be exchanged between the composing elements.

Figure 2:
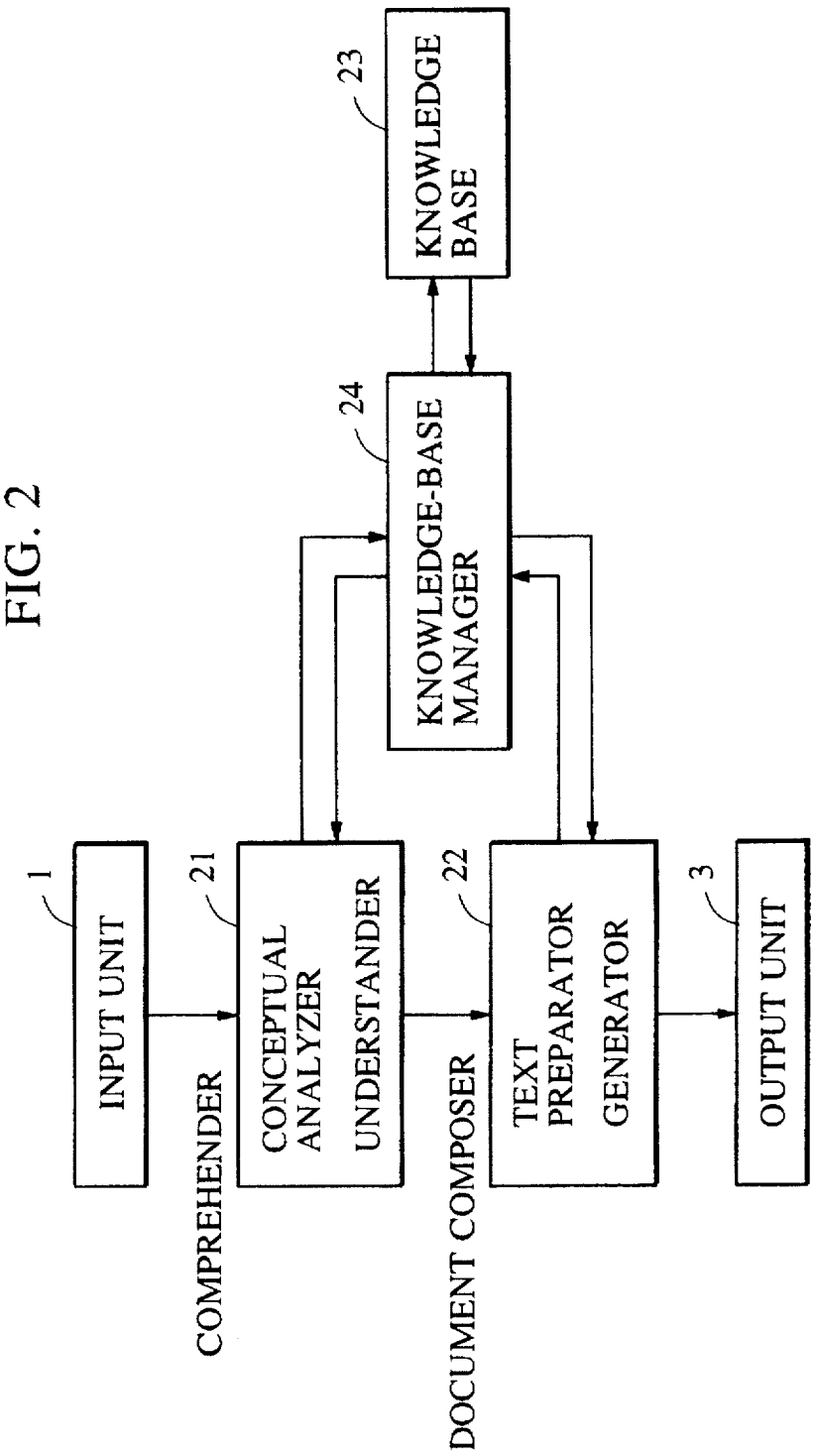
FIG. 2 is a functional block diagram for illustrating the fundamental configuration of the natural language processor embodying the present invention.

FIG. 2 is a functional block diagram for illustrating the fundamental configuration of the text preparing system embodying the present invention. This text preparing system is provided with the input unit 1, the output unit 3, a comprehender 21, a document composer 22, a knowledge base 23 and a knowledge base manager 24.

The comprehender 21 is provided with a CA 31 and an understander 32 (to be described later) and comprehends the contents of natural language information inputted from the input unit 1 by utilizing the knowledge contained in the knowledge base 23.

The document composer 22 contains a text preparator 33 and a generator 34 (to be described later) and prepares a document on the basis of the contents of the information comprehended by the comprehender 21 by utilizing the knowledge base 23. Then, the composer 22 outputs the prepared document to the output unit 3.

The knowledge base 23 provides necessary knowledge to the comprehender 21 and the document composer 22 through the knowledge base manager 24. Moreover, the knowledge base 23 stores new knowledge, which is generated during a process performed in the comprehender 21 and/or in the document composer 22, therein. The knowledge base manager 24 controls the reading of knowledge from the knowledge base 23 and the writing of knowledge to the knowledge base 23.

Figure 3:
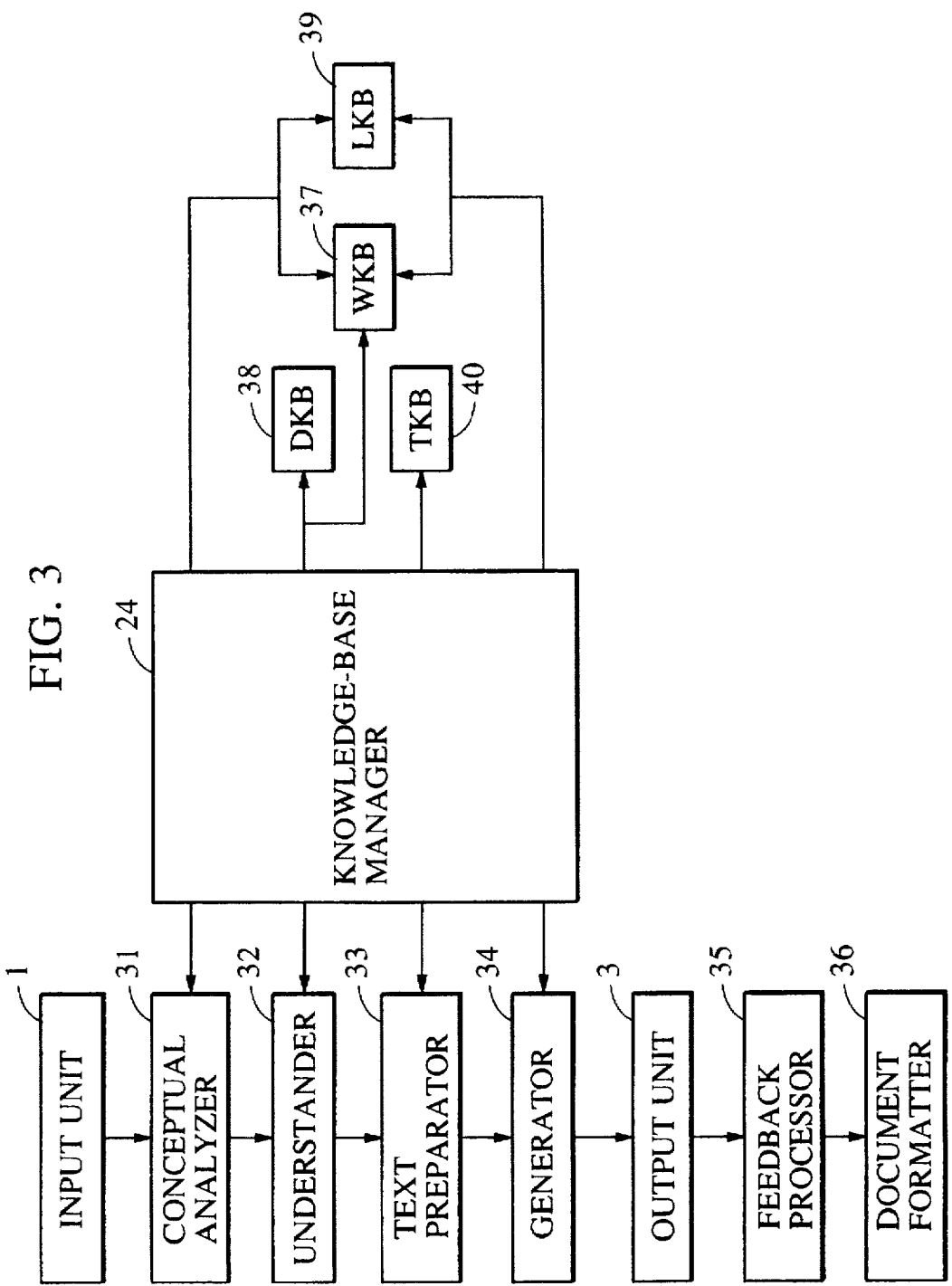
FIG. 3 is a functional diagram for illustrating the detailed configuration of the natural language processor embodying the present invention.

FIG. 3 is a functional diagram for illustrating the further detailed configuration of the system embodying the present invention. The conceptual analyzer (CA) 31 analyzes natural language information inputted by a user and converts this information to action descriptor (AD) which represents the meaning of this information.

Instead of first performing a syntax analysis on the inputted natural language and then giving meaning to the analyzed structure of a statement, the CA 31 obtains a semantic concept equivalent to the input information thereto and performs a processing on the basis of the obtained semantic concept. Further, the CA 31 performs a processing by predicting subsequent information from preceding information contextually, semantically and grammatically.

The understander 32 confirms the validity of the concept outputted from the CA 31 and complements the concept by, for instance, adding information if necessary. Further, the understander 32 infers a user's intention, which are behind his actions, by utilizing the "GOAL-PLAN" model of the domain knowledge base. Moreover, the understander 32 adds details of a part of the plan, to which no reference seems to be made by the user, by performing simulation and interactive processing.

The text preparator 33 forms a text in AD form, by selecting the relevant parts of the "GOAL-PLAN" of the user. The text preparator 33 prepares a complete text in the AD form on the basis of text composing rules which include those for the layout of a document. For example, in the case of preparing a letter, the text preparator has rules for preparation of a letter, which are based on the relation between the sender and the addressee of the letter.

The generator 34 generates a natural language text from the text in the AD form generated by the text preparator 33. In the generator, a text is generated in a tone suited for the requests and style of the user and the type of the document.

For example, in the case of preparing a letter, a text to be written in the letter is generated depending on the factors such as the style of the sender, the degree of familiarity between the sender and the addressee and the difference in social rank therebetween.

The knowledge base 23 has mainly four knowledge sub-bases, namely, a WKB 37, a DKB 38, a TKB 39 and an LKB 40.

The WKB 37 has knowledge of general matters. The DKB 38 has knowledge of the "GOAL-PLAN" or the like. The TKB 39 has the knowledge for composing a text, for instance, the aforementioned text composing rules. The LKB 40 has knowledge of language, which is equivalent to an ordinary dictionary, and is used in common for the analysis of a natural language performed by the CA 31 and for generating a natural language by the generator 34.

A feedback processor 35 receives an input from the user relating to various factors, which the user wishes to change or re-examine in output results and performs a feedback processing. Such factors are, for instance, the selection of another replaceable word or phrase (namely, a synonym or phrase having the same meaning), the conjugation of a verb (an infinitive, a gerund and so forth), the voice of a verb used in a sentence (namely, an active voice or a passive voice), the tone of a document, the levels or degrees of style and politeness, the representation of a concept, the rules for preparing a document, and the addition and deletion of a phrase and a sentence.

The document formatter 36 formats an outputted final natural-language sentence in accordance with the format of a document having an appropriate layout after such a sentence is generated. For instance, in the case of preparing a letter, the document formatter makes decisions about the format of the letter, such as a selection of American style (namely, a full-block style) or British style, an output on a letterhead, an addition of a date and the paragraphing of a text.

Figure 4:
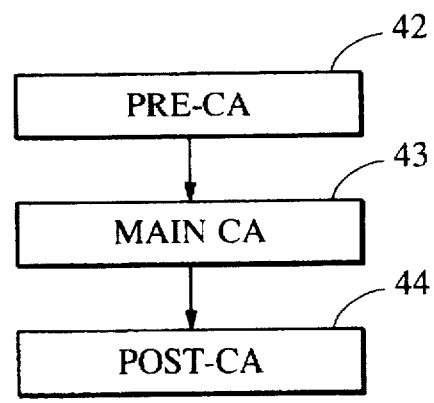
FIG. 4 is a diagram for illustrating the configuration of a conceptual analyzer (hereunder abbreviated as CA)

FIG. 4 is a block diagram for illustrating the detailed configuration of the CA 31. Conceptual analysis is a mapping from a natural language to a semantic representation. The role of the conceptual analysis is to convert a natural-language sentence or of pieces thereof into a knowledge structure. This conversion from a word or a group of words to a knowledge structure is performed by finding a morphological, syntactic, semantic or contextual clue.

In the CA 31, when processing an input thereto, the emphasis is put on the meaning thereof instead of generating the construction of a sentence by parsing the sentence. Thereby, even a grammatically erroneous statement and an incomplete sentence such as a piece of a statement can be handled. In the process of processing each word, the CA 31 predicts the subsequent word so as to make good use thereof in the subsequent process.

In the case of employing a conceptual analysis approach, a dictionary of the meaning of words plays a central role in the processing. Therefore, the CA 31 does not utilize definite grammar. The CA 31, however, can not dispense with utilization of constructive characteristics. Thus the CA 31 uses a noun group constituency when a term having a meaning is formed by a plurality of words.

FIG. 4 is a diagram for illustrating the detailed configuration of the CA 31. Further, a pre-CA 42 is operative to perform a pre-processing which will be described later by referring to FIG. 5. Moreover, a main CA 43 is operative to perform a main processing (to be described later by referring to FIG. 6) on each of inputted words. Furthermore, a post-CA 44 is operative to perform a post-processing which will be described later by referring to FIG. 7.

Figure 5:
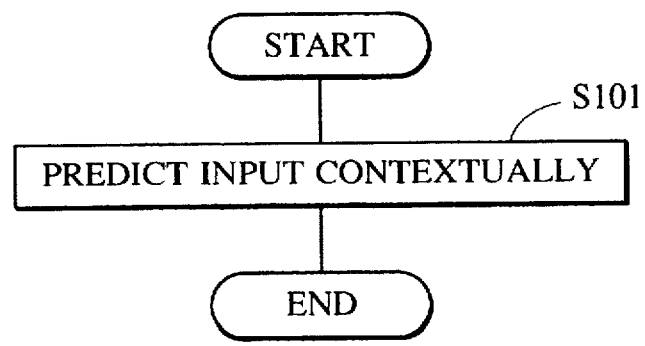
FIG. 5 is a flowchart for illustrating a processing performed in a pre-CA.

FIG. 5 is a flowchart for illustrating the preprocessing to be performed in the pre-CA 42. In step S101, the pre-CA 42 performs the pre-processing, namely, the pre-CA 42 contextually, from the preceding information predicts information, which should or may be next inputted.

Figure 6A:
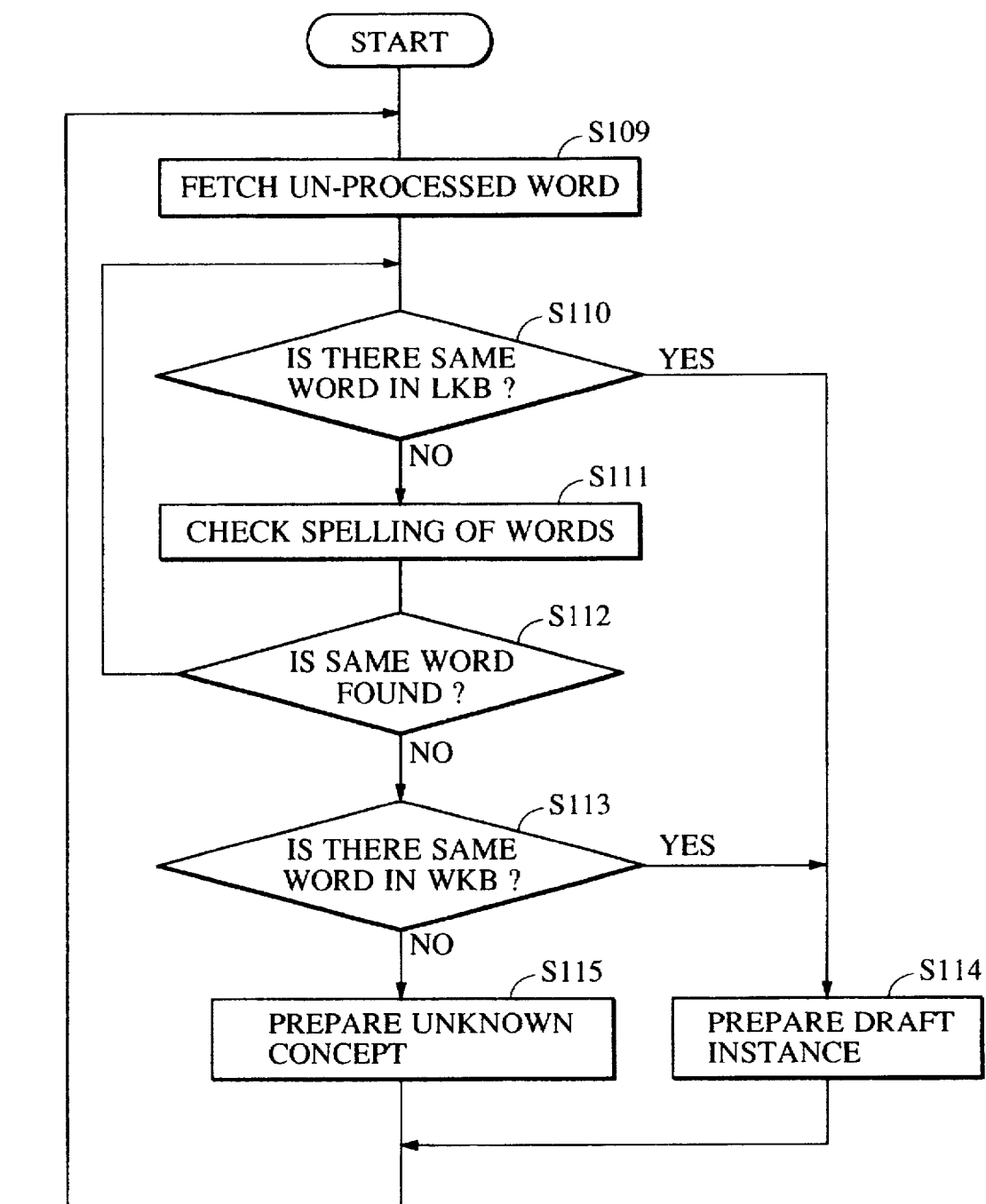
FIG. 6, which consists of FIGS. 6A and 6B, is a flowchart for illustrating a processing performed in a main CA.
Figure 6B:
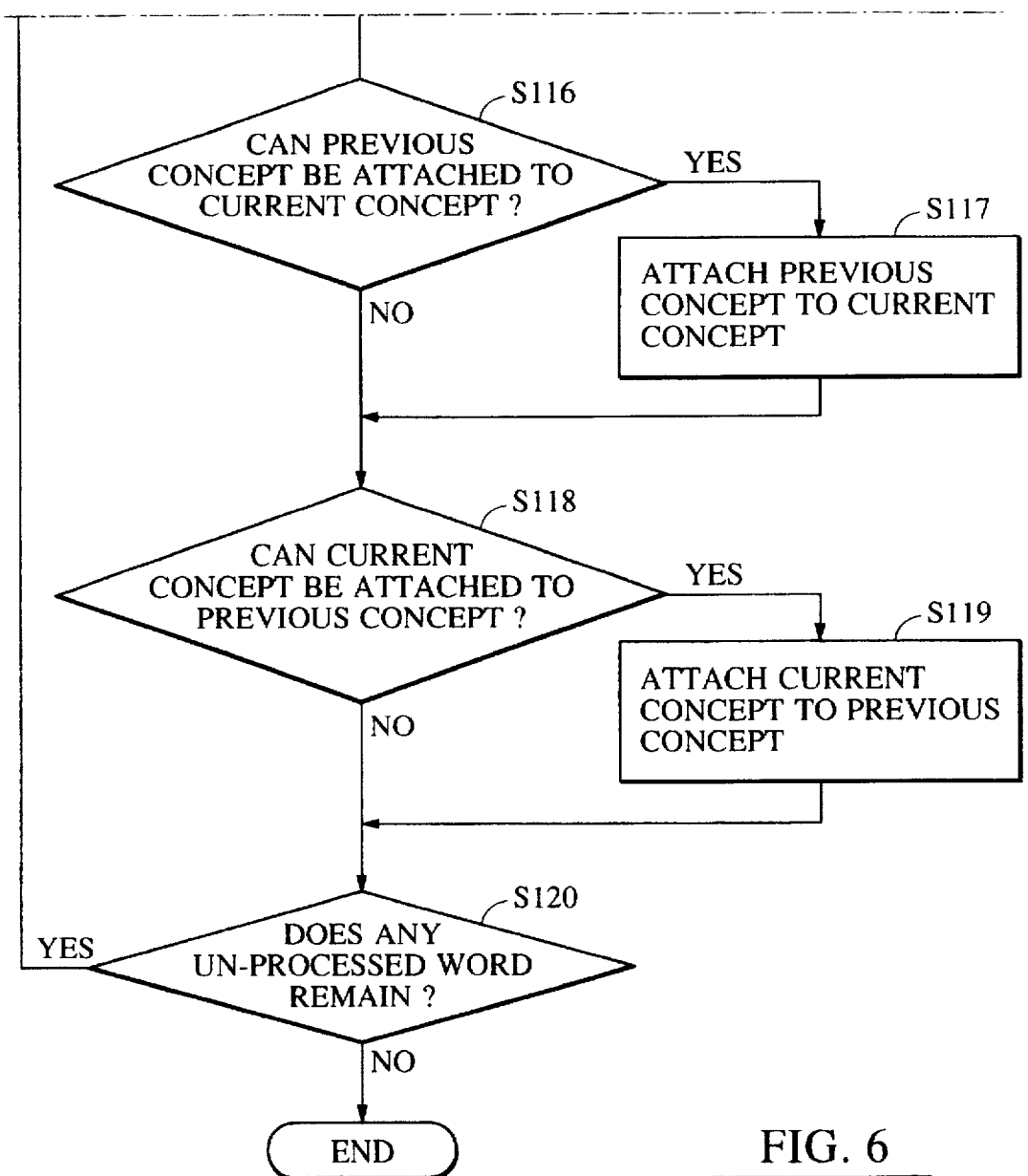

FIG. 6 is a flowchart for illustrating the main processing to be performed in the main CA 43.

First, in step S109, a leading unprocessed word is fetched in order to process words sequentially from the first word. Next, in step S110, the main-CA 43 searches the LKB 39 for the same word. If the word is found, a program for performing this process advances to step S114. In contrast, if not, the program advances to step S111 whereupon a word corrector (not shown) checks the spellings of words and corrects misspellings made by a user. Then, the main CA searches the LKB 39 containing the corrected words, again. In the case where the same word is not found in the LKB 39 again, or in the case where the main CA finds no misspelled words in the LKB 39, the program advances to step S113.

In this step S113, the main CA searches the WKB 37 for the same word. If the same word is found therein, the program advances to step S114. If not, the program advances to step S115.

In step S114, a corresponding draft instance is created from rules corresponding to the given word. Further, the subsequent word is predicted. Then, the program advances to step S116.

On the other hand, in step S115, an "unknown concept" is created because of the fact that the input word was not present in the knowledge base. Then, the program advances to step S116.

In step S116, it is checked whether or not the previously created concepts can be attached to the currently created concept. If so, the previously created concept is attached to the currently created concept in step S117. If none of the previously created concepts can be attached to the current concept, the program advances to step S118.

In step S118, it is checked whether the current concept can be attached to any of the previously created concepts. If so, the current concept is attached to the appropriate previous concept in step S119.

Subsequently, in step S120, it is checked whether any un-processed word remains in the input. If all words have been processed, this processing is finished. If there is an un-processed word remaining, the program returns to step S109. The same process consisting of steps S110 to S119 is performed on the next word. Thus, when all words are processed, the system goes on to the post-processing to be performed by the post-CA 44.

Figure 7:
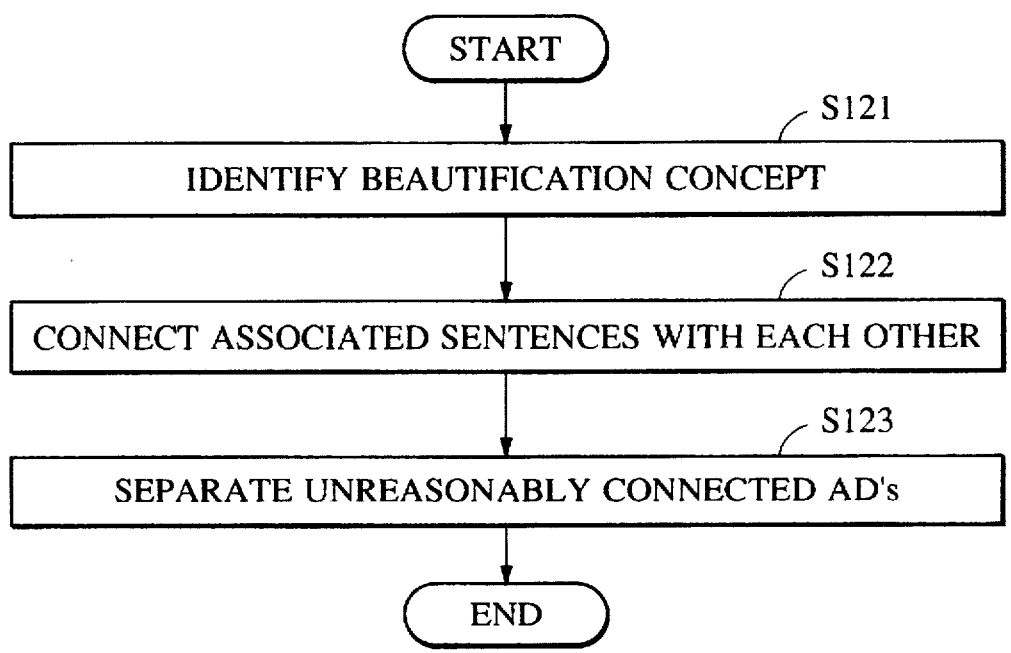
FIG. 7 is a flowchart for illustrating a processing performed in a post-CA.

FIG. 7 is a flowchart for illustrating the processing to be performed in the post-CA. FIGS. 8(a), 8(b) and 8(c) are diagrams for illustrating objects to be processed by the post-CA and results of the processing performed in the post-CA.

First, in step S121, a beautification concept is identified. For example, in the case where an input sentence is "I would like to meet you", result of the processing by the main CA is as given in FIG. 8(a). In this case, in step S121, the outer AD "WANT" is identified as a beautification concept.

Next, in step S122, associated statements are connected with each other. For instance, in the case where the statements (1) and (2) of FIG. 8(b) are inputted, the main processing performed in step S110 results in the two AD's given in FIG. 8(b). In this example, the first AD ("PTRANS") indicates the reason for the second AD ("WANT (MEET)"), so that these two AD's are connected with each other as illustrated in this figure, as a result of processing at step S122.

In step S123, unreasonably connected AD's are separated from each other. For example, in the case where an input expression is "reserve accommodation and pick up", result of the main processing performed in step S110 comes to be as illustrated in FIG. 8(c). In this case, the concept "MEET" (corresponding to "pick up") is connected to a slot in such a manner as to have AND-relation thereto. In such a case, at step S123, the result is divided into two AD's.

Figure 9:
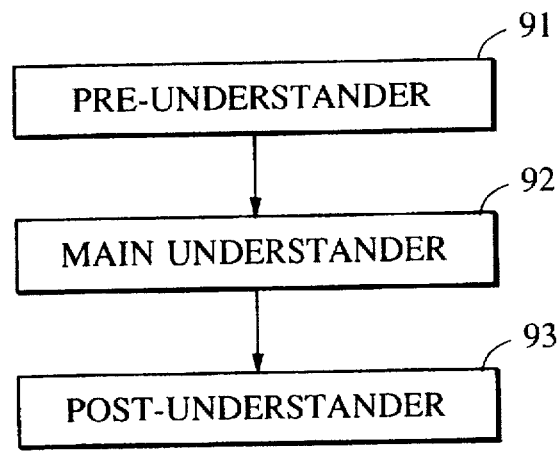
FIG. 9 is a block diagram for illustrating the detailed configuration of an understander.

FIG. 9 is a block diagram for illustrating the detailed configuration of the understander.

A pre-understander 91 of FIG. 9 is operative to perform a pre-processing which will be described later by referring to FIG. 10. A main understander 92 is operative to perform a main processing (to be described later by referring to FIG. 11). Furthermore, a post-understander 93 is operative to perform a post-processing which will be described later by referring to FIG. 12.

Figure 10:
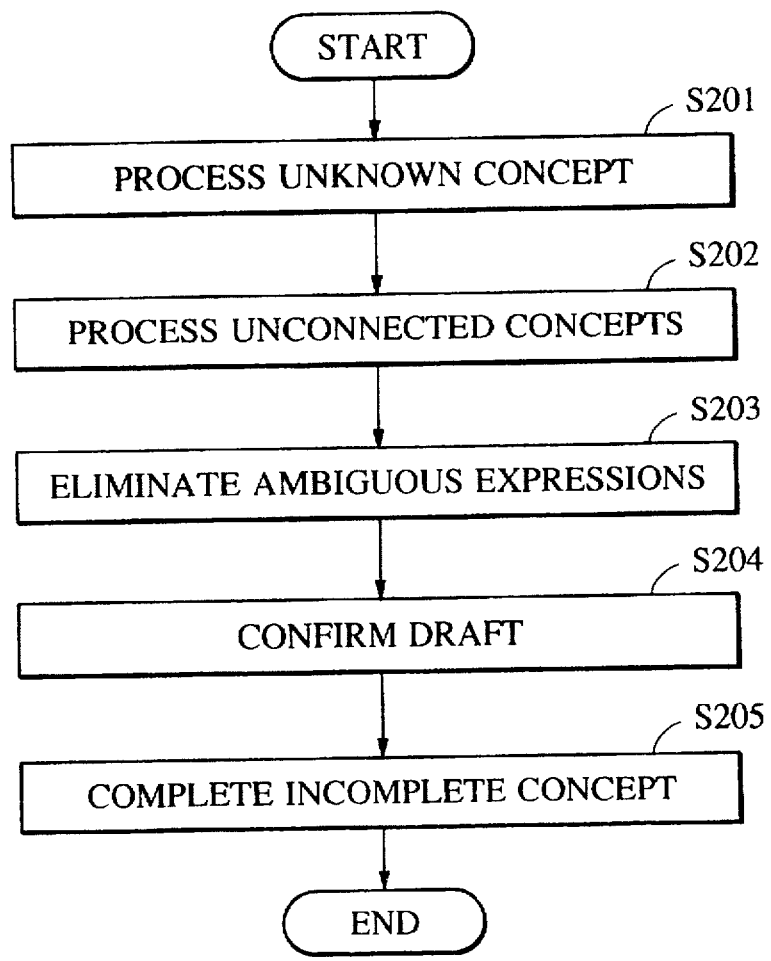
FIG. 10 is a flowchart for illustrating the details of a processing performed in a pre-understander.

FIG. 10 is a flowchart for illustrating the details of the processing to be performed in the pre-understander 91. Most of CAs can not analyze natural-language inputs without leaving some ambiguous input unresolved. Thus, it is necessary to eliminate the ambiguity and to verify the validity of the concept before the main understander 91 performs the processing. Therefore, after the CA 31 analyzes the input, the list of the concepts obtained as the result of its analysis is sent to the pre-understander 91.

As shown in FIG. 10, first, in step S201, the pre-understander processes an unknown concept created to represent a word new to the system. Hereupon, if the unknown concept can not be converted to a known concept from input information, the system requests the user to input supplemental information.

Next, in step S202, isolated concepts are processed. Further, in step S203, ambiguous expressions are eliminated.

Then, in step S204, the pre-understander 91 confirms the validity of a draft instance and updates and complements the draft instance according to the knowledge base 23. In addition to this, the pre-understander 91 confirms/corrects the date, using models of possible user errors (for instance, in the beginning of a year, many people tend to continue using the previous year) as well as confirms/corrects the tense of a sentence on the basis of the general knowledge contained in the WKB 37.

Next, in step S205, the incomplete concepts are completed by using the WKB 37 and the DKB 38.

Figure 11:
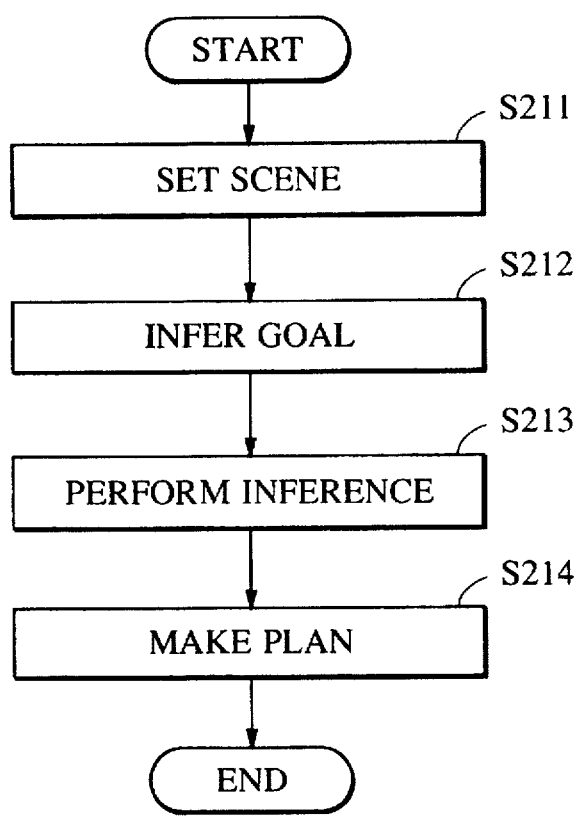
FIG. 11 is a flowchart for illustrating the details of a processing performed in a main understander.

FIG. 11 is a flowchart for illustrating the details of the processing to be performed in the main understander 92 which attempts to infer the user's intentions, which are behind his actions, by utilizing the predetermined GOAL-PLAN model of the user.

As shown in FIG. 11, a scene is set in step S211. Namely, an actor (that is, a person who is a subject or an object of an action) contained in the input information is first detected. Further, a theme corresponding to the actor and other general contexts are searched for. For example, in the case of preparing a letter, this processing includes the identification of the sender and the addressee, the establishment of the relation therebetween and their previous context. The details of the preparation of a letter will be described later.

Next, in step S212, the goal is detected. Hereupon, the AD obtained by the pre-understander 91 is processed in order to determine a main plan and a main goal. For instance, in the case of preparing the letter, if only the concept "MEET" is given in the input, the system infers from the coincidence in the field of occupation between the sender and the addressee that the reason for the sender to meet the addressee is that they discuss with each other.

This result of the inference is presented to the user. The user may approve this, alternatively, he may input another reason (namely, a reason which the user may have forgot to input) hereat. A concept inputted from the pre-understander 91 is an internal representation. Thus, the identification of the user's intention, becomes a primary task performed by the main understander 92.

If the implied intention is found, further inferring is performed in step S213. Hereat, the "GOAL-PLAN" inference required to infer the meaning, behind the actions, and to connect various inputs with one another is performed. During the understander's processing, a task network is formed for the purpose of facilitating handling and processing of the knowledge structures.

In step S214, a planning for understanding is performed. Even after the inference is carried out in step S213, a part of the input information may remain inexplicable. In such a case, planning is done from the topmost level goal to the input level goal in order to connect the remaining information until all of the input information becomes explicable. Thereby, the understanding process is completed.

Figure 12:
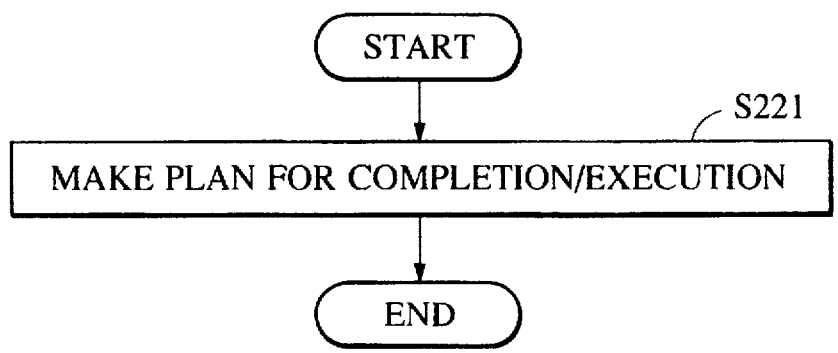
FIG. 12 is a flowchart for illustrating the details of a processing performed in a post-understander.

FIG. 12 is a flowchart for illustrating the details of the processing to be performed in the post-understander 93. In step S221, the post-processing, namely, the process of making plans for completion and execution is performed. That is, complete simulations corresponding to all scenarios are performed in order to detect preconditions, which should be fulfilled, and other goals. A user is informed of such goals and thus, necessary actions are taken.

Figure 13:
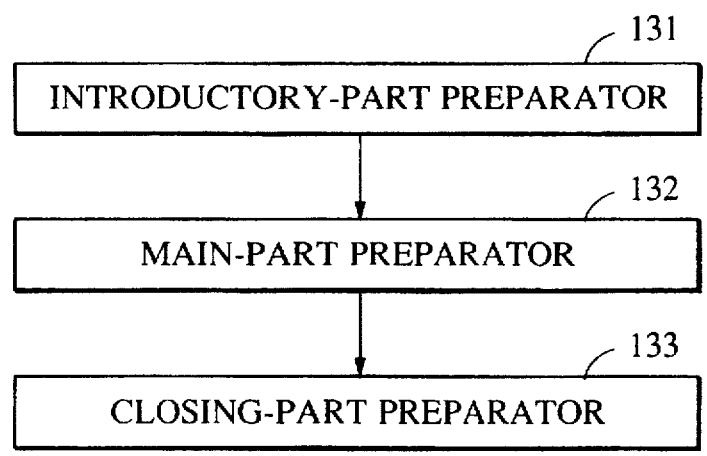
FIG. 13 is a diagram for illustrating the detailed structure of a text preparator.

FIG. 13 is a diagram for illustrating the detailed structure of the text preparator 33. In this figure, reference numeral 131 designates a introductory-part preparatory 132 a main-part preparator; and 133 a closing-part preparator. The text preparator 33 has access to rules for putting together information in order and preparing output texts. Such rules (described in TKB) include general rules for preparing a document and specific rules for creating text depending on the particular context, the user and other such factors.

Upon completion of the processing of the undertaker 32, the document preparator 33 scans the network of the user's goal-plan so as to extract the main goal and plan to be described in the output document. Further, the text preparator 33 puts the contents of the output document in order. Here, note that an output statement of the text preparator 33 is presented in the internal representation form, namely, the AD form and thus, is not a natural language statement.

Further, the text preparator has access to rules, which vary with the type of the document and the context conditions and the specific rules which also depend on user-specific. For example, in the case of preparing a letter, the familiarity between the sender and the addressee of the letter (namely, whether or not they have known each other, or whether or not they are close to each other), the difference in social rank therebetween, the frequency of exchange of letters therebetween and the contents of the latest correspondence therebetween can be cited as factors which affect the operation of preparing the letter.

Figure 14:
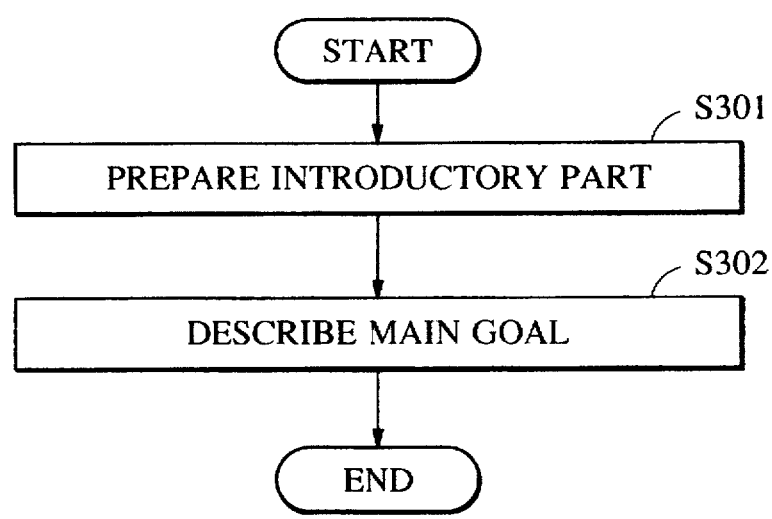
FIG. 14 is a flowchart for illustrating a procedure performed in an introductory-part preparator.

FIG. 14 is a flowchart for illustrating the procedure to be performed in an introductory-part preparator 131. First, in step S301, the introductory part of a document is prepared. The introductory part depends not only on the type of the document but on the background thereof and previously prepared relevant documents.

To take the case of preparing a letter, the text of the introductory part of the letter depends largely upon whether the letter is a reply to the addressee, or whether the letter is a first letter to the addressee. Next, in step S302, the main goal, namely, the purpose of the letter is stated.

Figure 15:
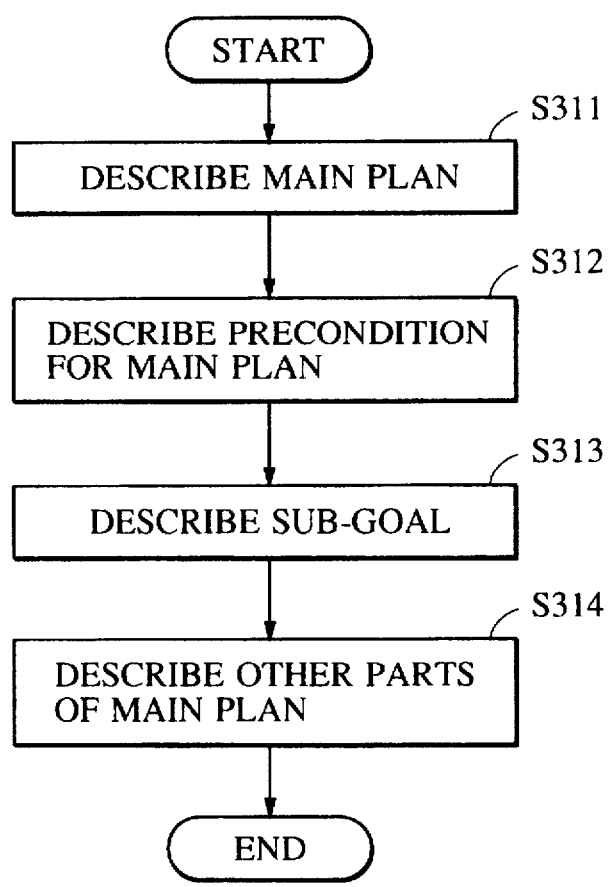
FIG. 15 is a flowchart for illustrating a procedure performed in a main-part preparator.

FIG. 15 is a flowchart for illustrating the procedure to be performed in the main-part preparator 302.

First, in step S311, the main plan is stated. Subsequently, in step S312, the precondition for the main plan is described. Further, in step S313, another operation to be performed (namely, a sub-goal) is described. Next, in step S314, another part of the main plan is described.

In the case of preparing a letter, the main plan, the sub-goal, the sender's request and so forth are described as primary parts of the letter.

Figure 16:
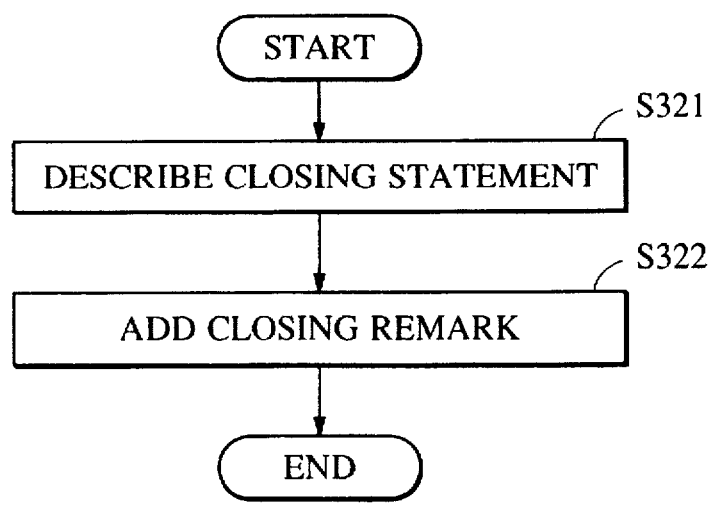
FIG. 16 is a flowchart for illustrating a procedure performed in a closing-part preparator.

FIG. 16 is a flowchart for illustrating the procedure to be performed in a closing-part preparator 303. Namely, in step S321, the closing-statement is described and further, the closing-remark is added thereto.

In the case of preparing a letter, the closing remark is added thereto by the text preparator on the basis of the relation between the sender and the addressee thereof.

Figure 17:
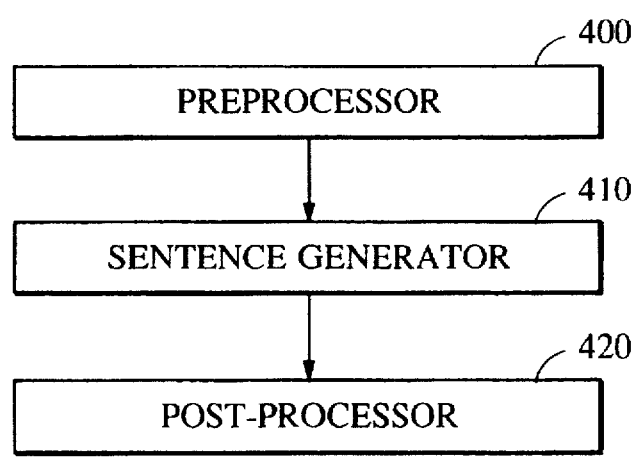
FIG. 17 is a diagram for illustrating the detailed configuration of a generator.

FIG. 17 is a diagram for illustrating the detailed configuration of the generator 34. As shown in this figure, the generator 34 consists of three portions, namely, a preprocessor 400, a statement generator 410 and a post-processor.

The generating process to be performed by the generator 34 is equivalent to the inverse process of the analysis. A generating operation is mapping from a knowledge structure to a sequence of natural language statements. The preprocessor 400 performs a pre-processing on the list of AD's outputted from the text preparator. Then, the processed list is sent from the preprocessor to the statement generator 410, whereupon a conversion from a concept to a natural language is performed.

Figure 18:
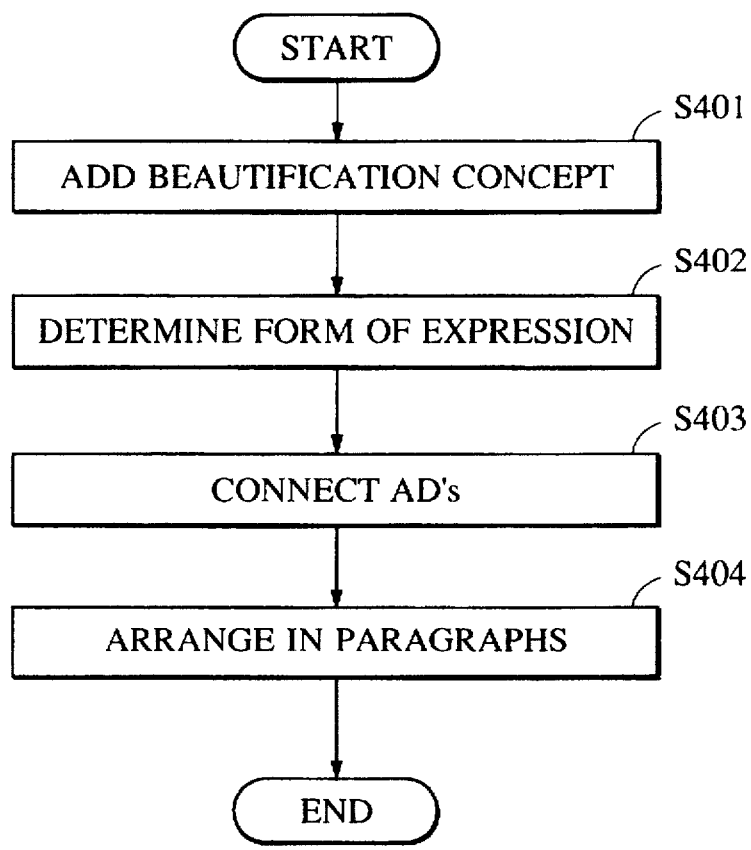
FIG. 18 is a flowchart for illustrating a procedure performed in a pre-processor.

FIG. 18 is a flowchart for illustrating the procedure to be performed in the pre-processor 400. One of primary features of the pre-processor 400 is an addition of a beautification concept, which is performed in step S401. Further, another feature of the pre-processor 400 is a decision of the expression form (for example, a suggestive tone, an interrogative tone) of a request or an inquiry, which is performed in step S402.

For instance, in a letter preparing system, the expression form is determined depending on the difference in social rank between a sender and an addressee of a letter, and whether or not they have known each other, and so on.

The pre-processor 400 has rules for connecting a plurality of AD's with one another in step S403. Further, the input AD is converted into a linguistic AD having additional linguistic information such as a role, a gender and a case. Further, to generate a pronoun, the number of referring thereto is registered. Moreover, special linguistic structures such as a parallelism and a causality are generated by using the slot to which the AD is connected.

The sentence generator 410 is operative to prepare a list called "GLIST" which carries all concepts to be represented.

Further, the sentence generator 410 puts the AD's, which are received from the pre-processor 400, serially in the GLIST in order to convert the AD's into the natural language. Moreover, the sentence generator 410 has "demons" corresponding to grammatical representations such as those of the possessive case and the infinitive case. The demons intervene in the ordinary flow of the process to be performed by the generator. Then, the demons instruct the generator to further modify the representation of the concept.

Figure 19:
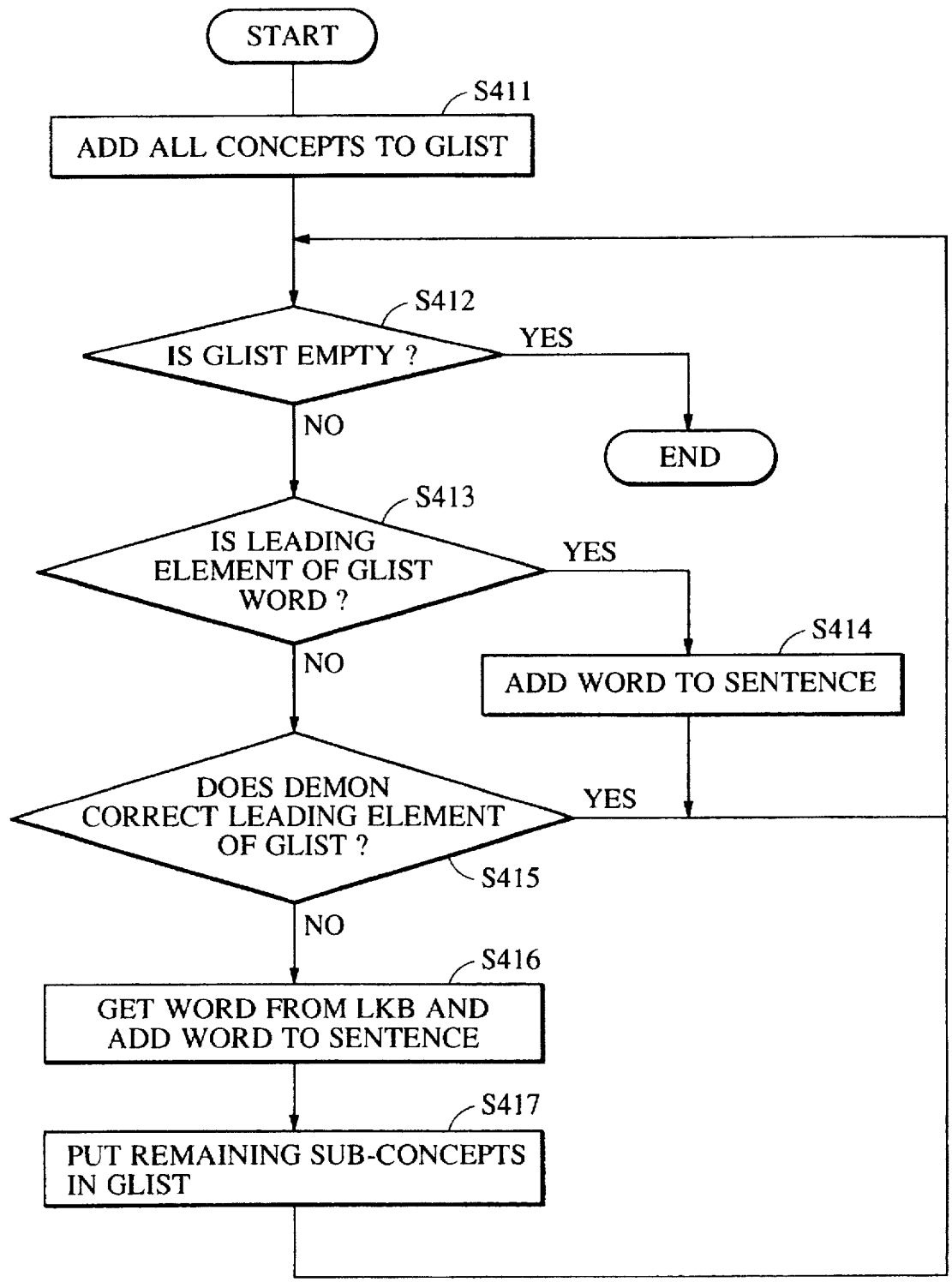
FIG. 19 is a flowchart for illustrating a procedure performed in a sentence generator.

FIG. 19 is a flowchart for illustrating the procedure to be performed in the sentence generator 410.

First, in step S411, all of the concepts are put in the GLIST. Then, it is checked in step S412 whether or not the GLIST is empty. If empty, the processing of the GLIST is terminated. If not empty, a program for performing this process advances to step S413 whereupon it is examined whether or not a leading element of the GLIST is a word. In the case where the leading element is a word, this word is picked out of the GLIST and is added to the statement. Subsequently, the program returns to step S412. Thereafter, the subsequent information is processed.

If it is found in step S413 that the leading element is not a word, it is further checked in step S415 whether or not the "demon" modifys the demon has modified the concept, the concept of the leading element of the GLIST. If modified, the program returns to step S412 whereupon the concept is processed. If not, the program advances to step S416 whereupon the concept of the GLIST is converted to a word by referring to the LKB. Then, in step S417, the remaining sub-concept is put in the GLIST.

Figure 20:
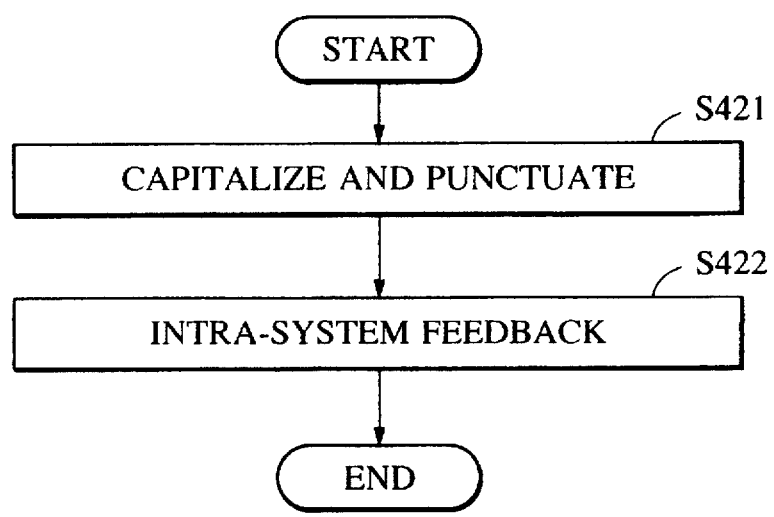
FIG. 20 is a flowchart for illustrating a procedure performed in a post-processor.

FIG. 20 is a flowchart for illustrating the procedure to be performed in the post-processor 420.

The post-processor 420 performs post-edit operations such as the capitalization of the leading character of the sentence and punctuation after the sentence generator 410 generates a natural language output sentence. The post-generator 420 checks the consistency of the text, which is generated by using an intra-system feedback on the basis of the given input and the system's understanding, in step S422 as another primary function thereof. Thus, a consistent result is outputted to the feedback processor 35.

Figure 21:
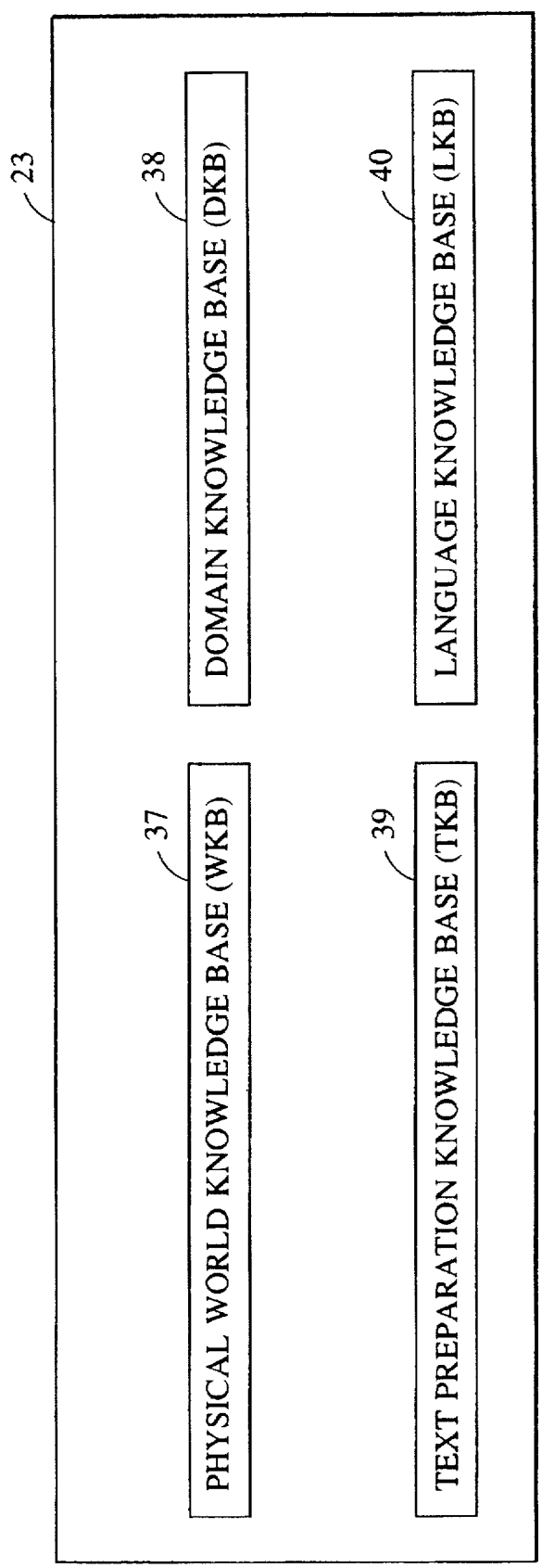
FIG. 21 is a diagram for illustrating the structure of a knowledge base.

Next, the structure of the knowledge data base utilized in the aforementioned processing will be described hereinbelow. The structure of the knowledge base 23 used in this embodiment is illustrated in FIG. 21. As described above, the knowledge base 23 consists of four sub-knowledge bases, namely, the WKB 37, the DKB 38, the TKB 39 and the LKB 40.

FIG. 22 is a diagram for illustrating primary types (of classes) of knowledge provided in the WKB 37. As illustrated in this figure, the types "Physical Objects", "Abstract Entities", "Space (place)", "Time (Events)", "Driving Forces", "Results of Driving Forces or Actions", and "State Descriptors" are employed as the primary types.

Figure 23:
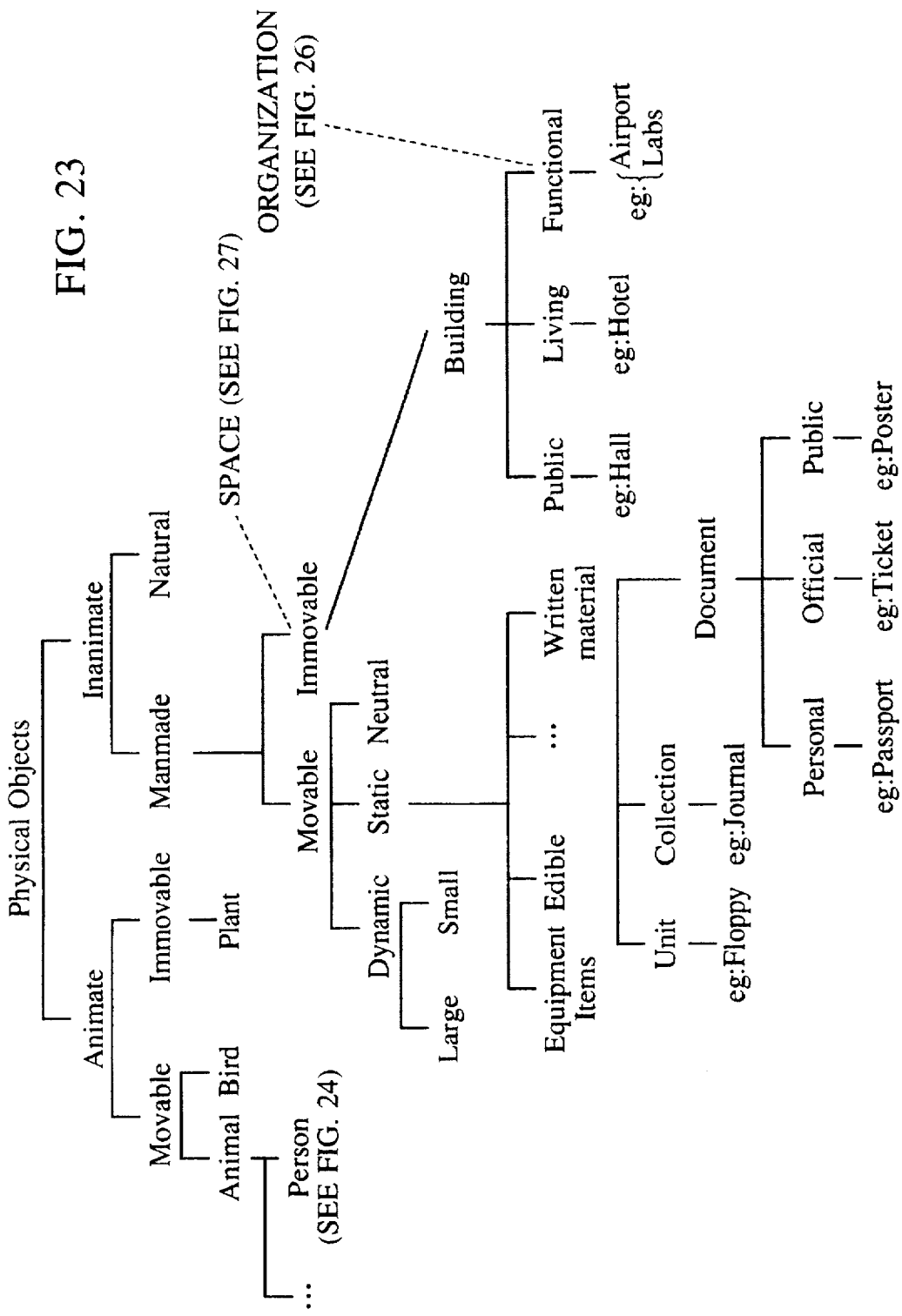
FIG. 23 is a diagram for illustrating primary types of knowledge structures which are present in the class "Physical Object"

FIG. 23 is a diagram for illustrating the primary types of knowledge structures which are present in the "Physical Object".

FIG. 24 is a diagram for illustrating slots of the knowledge structure of the class "Person" and examples thereof.

Figure 25:
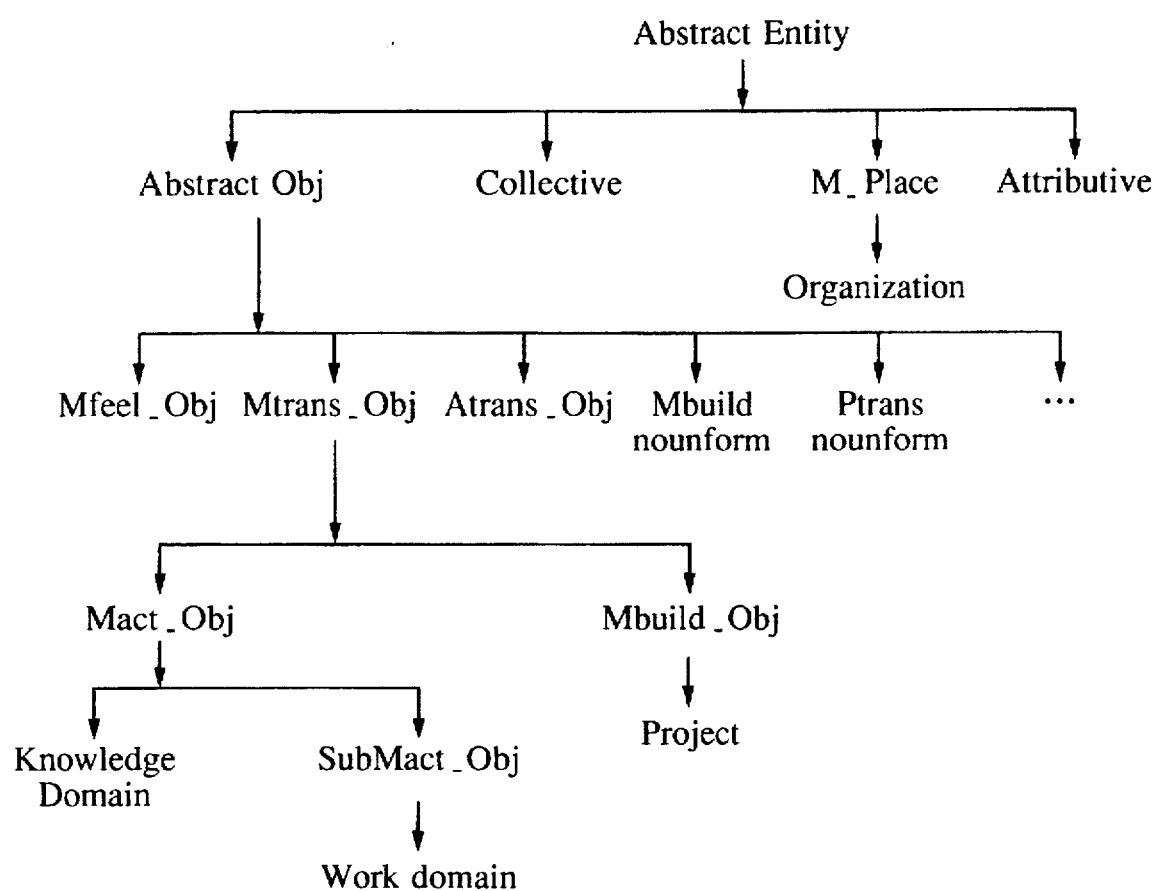
FIG. 25 is a diagram for illustrating primary types of knowledge structures which are provided under in the class "Abstract Entities"

FIG. 25 is a diagram for illustrating the primary types of knowledge structures which are provided under the "Abstract Entities".

FIG. 26 is a diagram for illustrating slots of the knowledge structure of the "Organization" and examples thereof.

Figure 27:
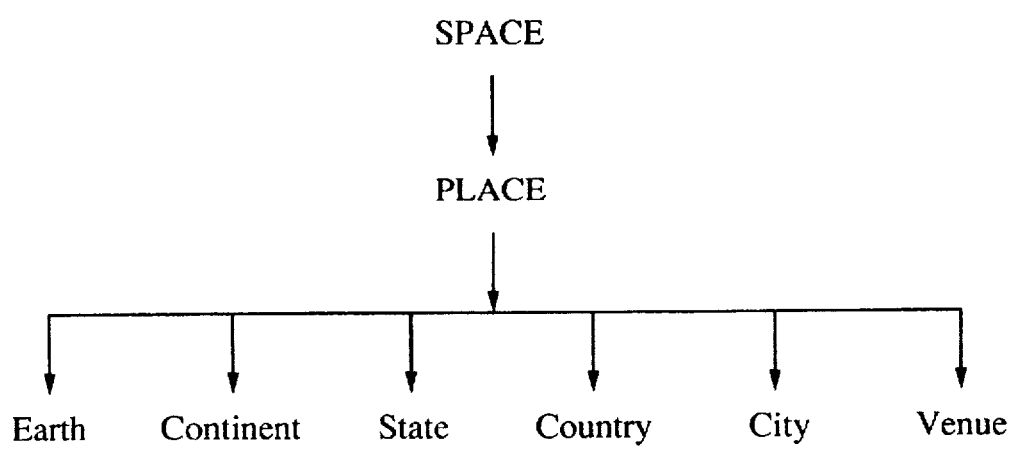
FIG. 27 is a diagram for illustrating primary types of knowledge structures which are provided under the class "Space"

FIG. 27 is a diagram for illustrating the primary types of knowledge structures which are provided under the "Space".

FIG. 28 is a diagram for illustrating slots of the knowledge structure of the "Place" and examples thereof.

Figure 29:
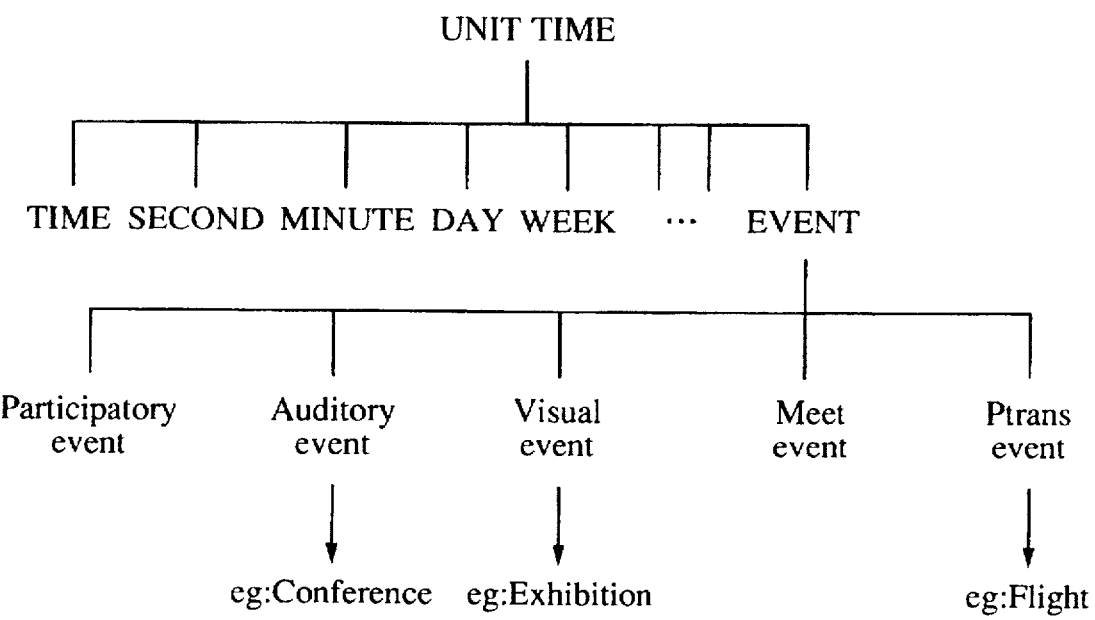
FIG. 29 is a diagram for illustrating primary types of knowledge structures which are present in the class "Time"

FIG. 29 is a diagram for illustrating the primary types of knowledge structures which are present in the class "Time".

FIG. 30 is a diagram for illustrating slots of the knowledge structure of the "Unit_Time" and the "Time" and examples thereof.

Figure 31:
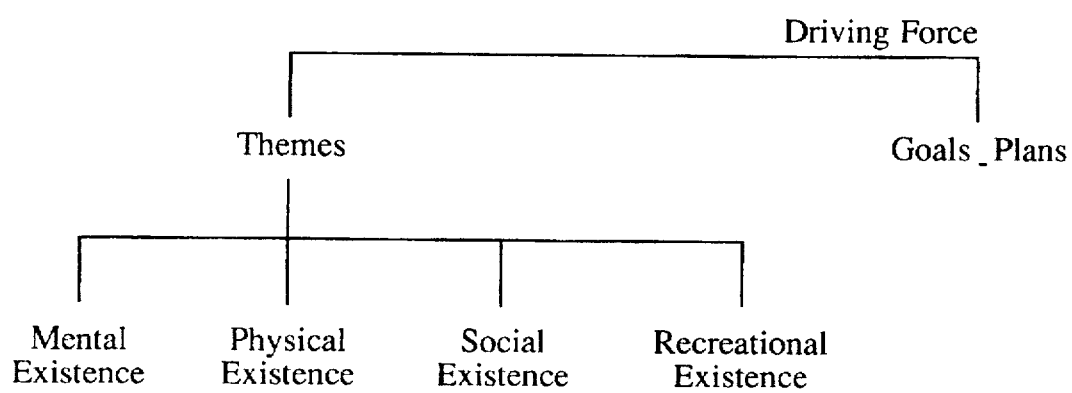
FIG. 31 is a diagram for illustrating primary types of knowledge structures which are present in the class "Driving Forces"

FIG. 31 is a diagram for illustrating the primary types of knowledge structures which are present in the "Driving Forces".

FIG. 32 is a diagram for illustrating slots of the knowledge structure of the "Goal-Plan" and examples thereof.

FIG. 33 is a diagram for illustrating slots of the knowledge structure of the "MOPS" and examples thereof.

FIG. 34 is a diagram for illustrating slots of the knowledge structure of the "Scene" and examples thereof.

Figure 35:
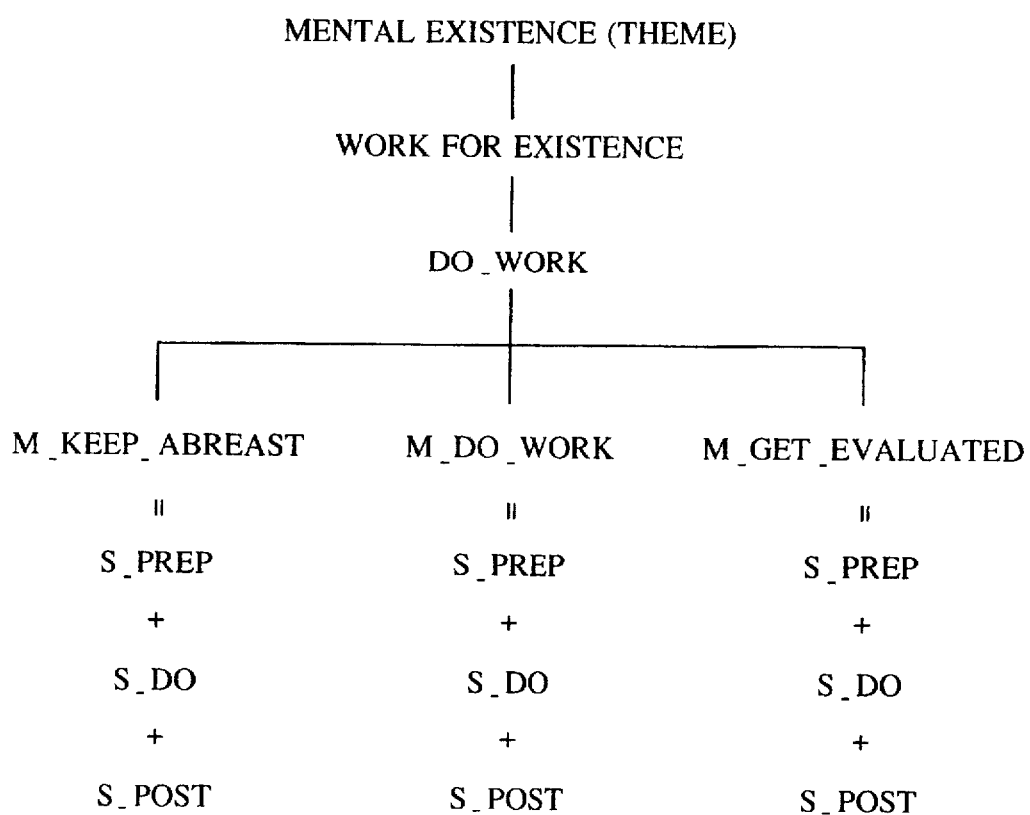
FIG. 35 is a diagram for illustrating the structures of generalized goal and plan.

FIG. 35 is a diagram for illustrating the structures of generalized goals and plans.

FIG. 36 is a diagram for illustrating examples of the scenes which depend on domains.

Figure 37:
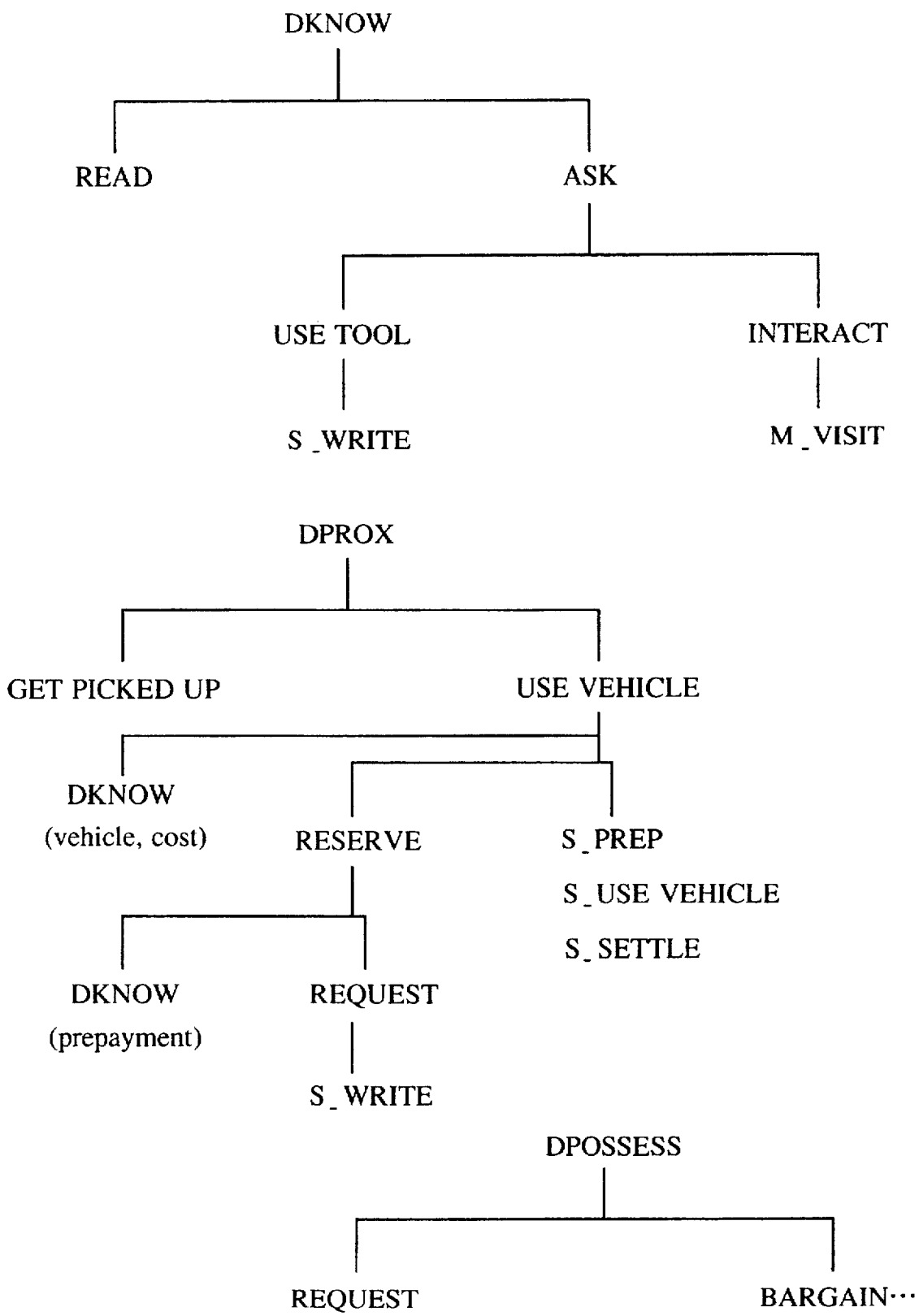
FIG. 37 is a diagram for illustrating examples of fundamental goals and their plans which do not depend on generalized domains.

FIG. 37 is a diagram for illustrating examples of fundamental goals and their plans which do not depend on generalized domains.

As shown in this figure, in the case of "DKNOW", general plans are "READ" and "ASK". In contrast, in the case where the domain is "DO-RESEARCH (doing research environment)", "ABSORB (for instance, attend conference)" is added thereto at the same level as of the "READ" and the "ASK".

FIG. 38 is a diagram for illustrating the primary types of goals, plans, "MOPS" and "SCENES" used in the case of preparing a letter.

Figure 39:
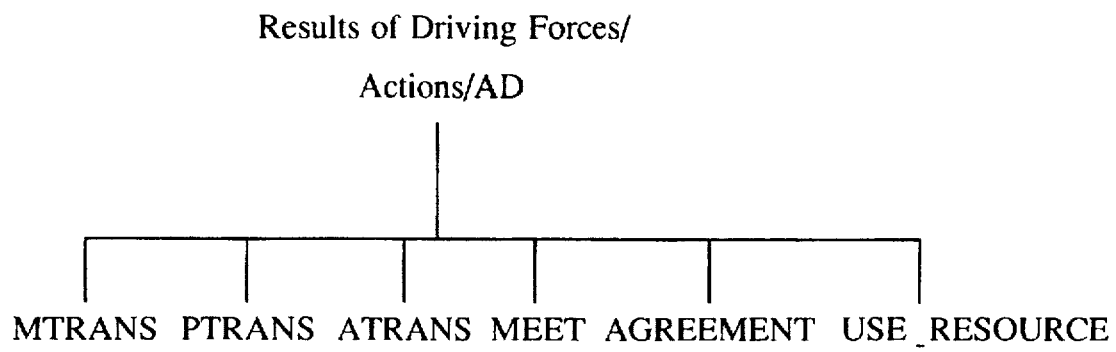
FIG. 39 is a diagram for illustrating a part of the class "Results of Driving Forces or Action Descriptors (hereunder abbreviated as AD)"

FIG. 39 is a diagram for illustrating a part of the "Results of Driving Forces or Actions Descriptors".

FIG. 40 is a diagram for illustrating the structure of AD and examples thereof.

Figure 41:
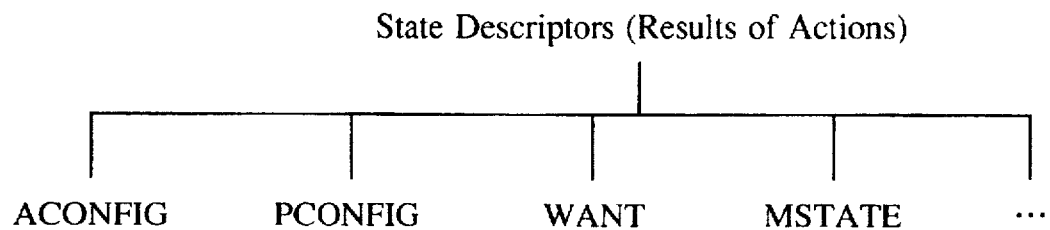
FIG. 41 is a diagram for illustrating slots of the knowledge structure of the class "AD" and an example thereof.

FIG. 41 is a diagram for illustrating slots of the knowledge structure of the class "AD" and an example thereof.

FIGS. 42(a) and 42(b) are diagrams for illustrating an example of a TKB.

FIGS. 43 to 45 illustrate detailed rules of the TKB, which are used for preparing a letter. FIG. 43 is a diagram for illustrating the detailed rules of the TKB for preparing an introductory-part of a letter in step S301 of FIG. 14 by means of the introductory-part preparator 131. FIG. 44 is a diagram for illustrating the detailed rules of the TKB for the description of the main goal of the letter, which is performed in step S302 of FIG. 14 by means of the introductory-part preparator 131, and the processing to be performed in steps S311 to S314 of FIG. 15 by the main-part preparator 132. FIG. 45 is a diagram for illustrating the detailed rules of the TKB, which are used for preparing the letter in steps S321 to 322 of FIG. 16 by means of the closing-part preparator 133.

FIG. 46 is a diagram for illustrating an example of the LKB.

Figure 47A:
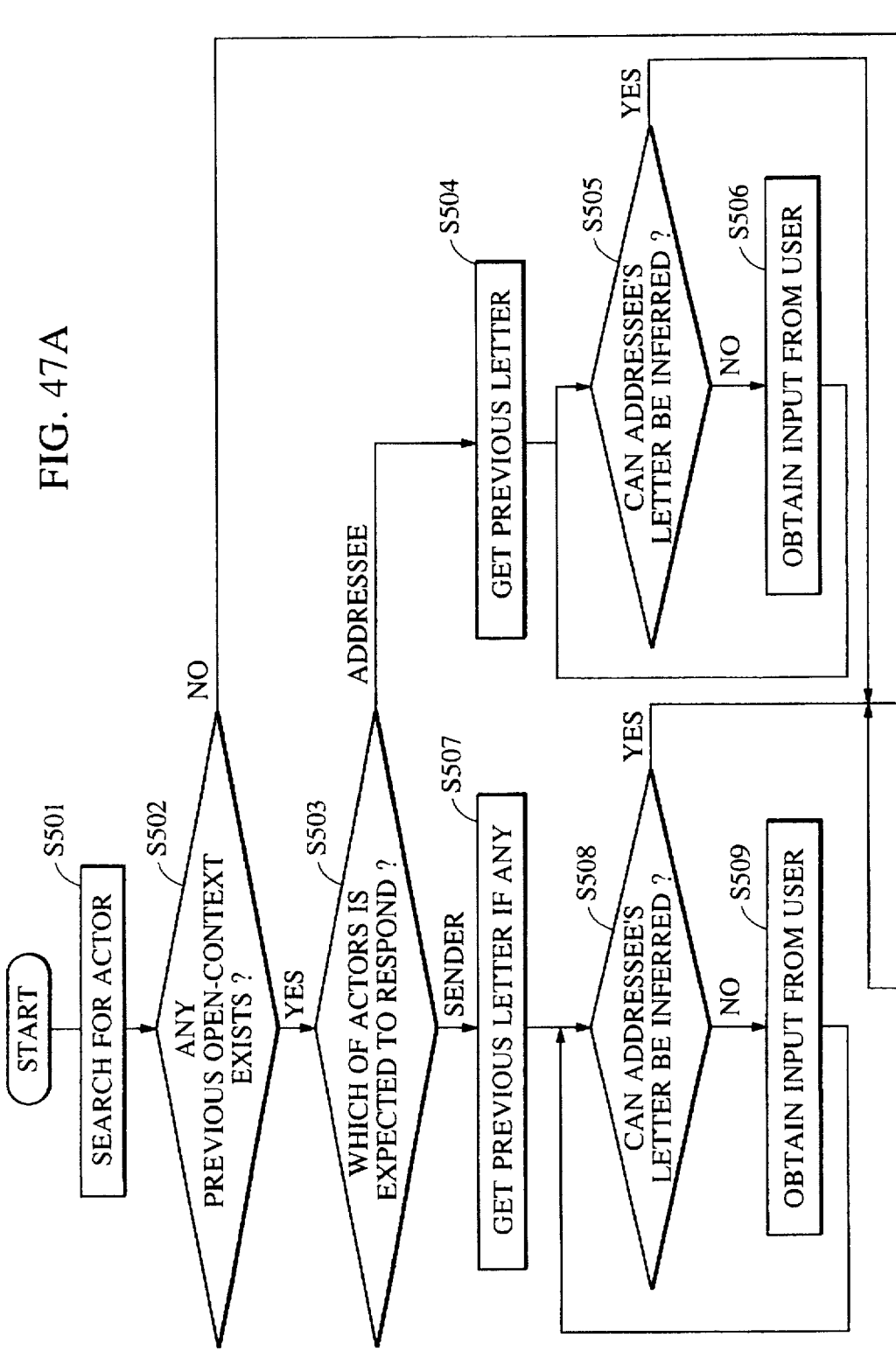
FIG. 47, which consists of FIGS. 47A and 47B, is a flowchart for illustrating the detailed procedure involved in 'SET-SCENE' in the case of preparing the letter.

FIG. 47 is a flowchart for illustrating the detailed procedure involved in "SET-SCENE" in step S211 of FIG. 11 performed by the Main-Understander 92 in the case of preparing the letter.

First, in step S501, a sender and an addressee of the letter, which are contained in the input information, are detected. Next, in step S502, the establishment of the relation between both of the sender and the addressee is attempted. To that end, the data base and the input information are searched for existence of any previous open-context between the sender and the addressee. If such correspondences therebetween are not found, this input information is assumed to be a first letter and a program for performing this process advances to step S510. In contrast, if such correspondences therebetween are detected, the program advances to step S503 whereupon it is judged which of the two, the sender or the addressee is now expected to respond.

If the addressee is expected to do so, previous letters are retrieved from the data base in step S504. Then, it is judged in step S505 whether or not a letter of the addressee can be inferred. If not, input information is obtained from a user in step S506. Subsequently, the program returns to step S505. If the letter of the addressee can be inferred, the program advances to step S510.

In contrast, in the case where the sender is expected to respond, if previous letters are found in step S507, such letters are retrieved. Then, it is judged in step S508 whether a letter of the addressee can be inferred. If it can be inferred, the program advances to step S510. If not, information is obtained from the user in step S509 and the program returns to step S508.

In step S510, reply of the sender is prepared on the basis of the contents of the input information and those of the retrieved information and inferred letter of the addressee. Then, it is judged in step S511 whether or not the input information is complete. If complete, this processing is finished. If not complete, the lacking information is obtained from the user in step S512 and next, the program returns to step S511.

In contrast, if no relation between the sender and the addressee is detected, it is judged in step S513 whether or not the input information is complete. If complete, this processing is finished. If not complete, the lacking information is obtained from the user in step S514 and next, the program returns to step S513.

Hereinafter, an operation of this embodiment will be described by using a practical example in the case of preparing a letter.

As shown in FIG. 48, when the expression "meet John at Duke on 7th after IJCAI conference to discuss on LWS, reserve accommodation." is inputted, the CA 31 outputs the concepts C1 to C5 to the understander 32 as a result of the analysis of the input expression. The processing to be performed on these concepts by the pre-understander 91 will be described hereunder by referring to a flowchart of FIG. 10.

First, in step S201, the pre-understander 91 examines each of the concepts. At that time, two of these concepts, namely, C2 and C4 are determined as unknown concepts. Because of the facts that the concept C3 subsequent to the concept C2 is "conference" and is not connected to another concept, the pre-understander 91 infers that the concept C2 (IJCAI) is the name of a conference. Here, the user may input information representing the place where the conference is held, the period of time when the conference is held, subject for discussion and so forth.

On the other hand, in view of the facts that the concept C4 (LWS) appears subsequently to the concept C11 represented by the word "discuss" and that the concept C11 can be followed by five types of groups of nouns of FIG. 49 as possible candidates for filling the slot of "object", the pre-understander asks the user whether or not LWS is the name of one of the groups of FIG. 49. In this case, LWS is a name and are capital letters. Therefore, it is nearly impossible to select 3, 4 or 5.

In the case of this example, there are no objects to be processed in steps S202 and S203. Thus a program for performing this process advances to step S204. Here, note that two persons named John are found in the SDB of FIG. 49. Therefore, the system performs a confirmation process on the results obtained by CA31 as illustrated in a flow chart of FIG. 50.

First, in step S521, the system asks the user which of the persons named John the user selects.

If the user selects "John Smith" in step S522, the system further confirms in step S523 whether or not John is transferred to the Duke University. This is because the SDB indicates that John Smith belongs to the Rochester University, while the word "Duke" is inputted together with the word "John".

In the case where the user's answer is "Yes", the program advances to step S524 whereupon the name of the University, to which "John Smith" belongs, is changed to "the Duke University" in the SDB. In contrast, if the user's answer points out his mistake, the corresponding concept is corrected in step S525. If the user's answer points out the temporary transfer (or tentative movement) of John Smith, this fact is described in the SDB in step S526.

Figure 50:
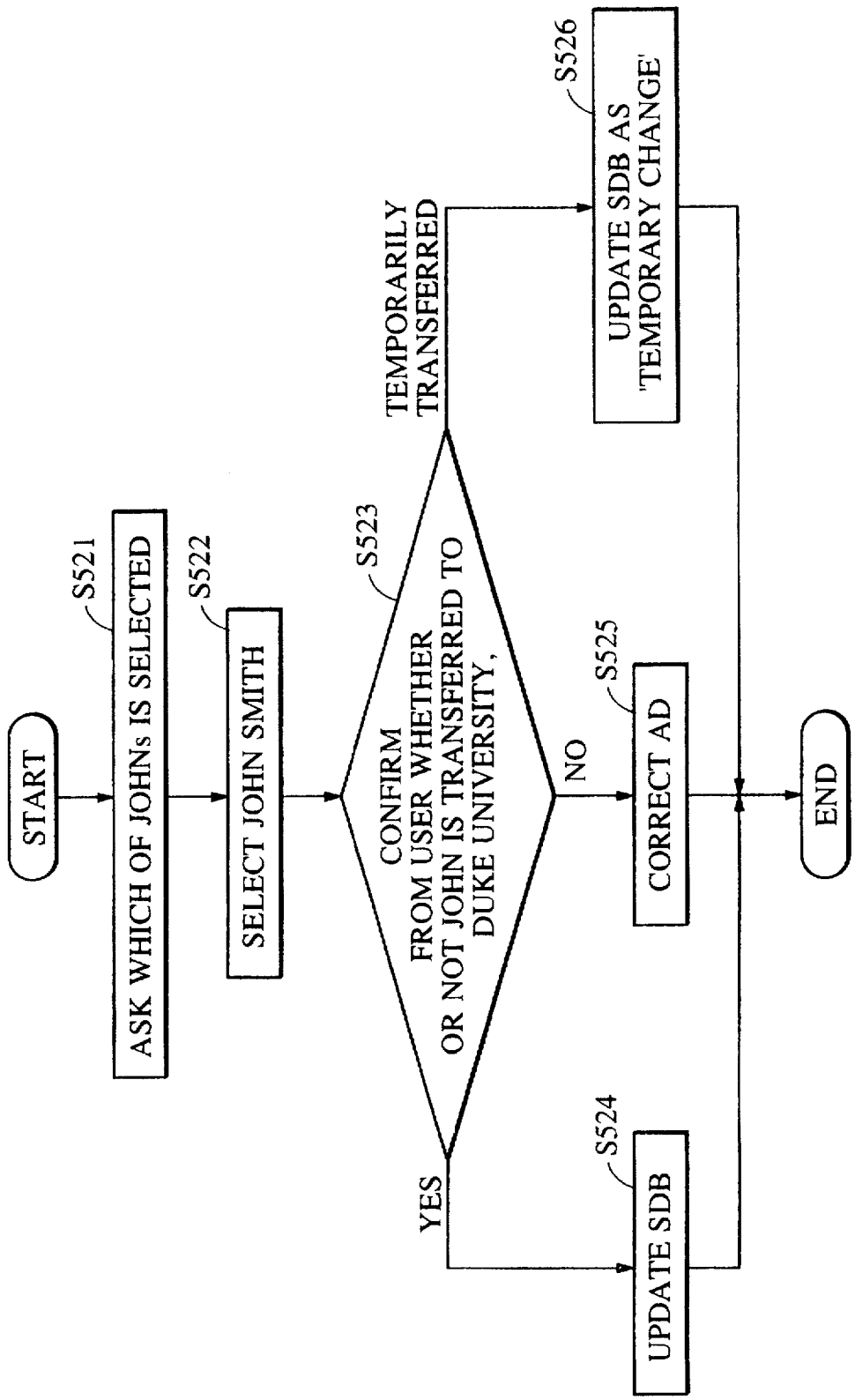
FIG. 50 is a flowchart for illustrating a confirmation processing.

Incidentally, in the aforementioned case, if the SDB indicates that only one person named John belongs to the Duke University, the process of FIG. 50 may be omitted and this person may be finally identified as the one searched for by the user.

Next, in step S205, the resultant concepts are completed with more inferred information. For instance, an inference concerning a time is performed by using the WKB. Here, it is assumed that the clock/calendar of the system indicates the present date as Mar. 15, 1993, that the tense is "future tense", that the period of time, during which the conference of IJCAI is held, is Apr. 24 to 28, 1993 (the information representing this period is inputted in step S201, though this information may be inputted in step S205) and that the user wishes to meet John after this conference. Thus the system infers that the month indicated by the letter is the next month after April. Thus, the system completes the date "7th" represented by the information as "7th May, 1993".

Further, note that the slot information corresponding to the concept C5 "Iobj Reason" is missing. The understander, however, infers from the knowledge contained in the DKB 38 that the action is "USE RESOURCE", as illustrated in FIG. 51.

Next, the processing by the main understander 92 will be described hereinbelow by referring to FIG. 11.

First, in step S211, actors contained in the information are detected. In this input example, the sender is Aruna Rohra and the addressee is John Smith. Next, the establishment of the relation between the sender and the addressee is attempted. For this, the data base is searched for the contents of the correspondences therebetween, which have been obtained up to this point of time. If no contents of the correspondences therebetween are present in the data base, this input letter is inferred to be a first letter for making an agreement therebetween.

Figure 53:
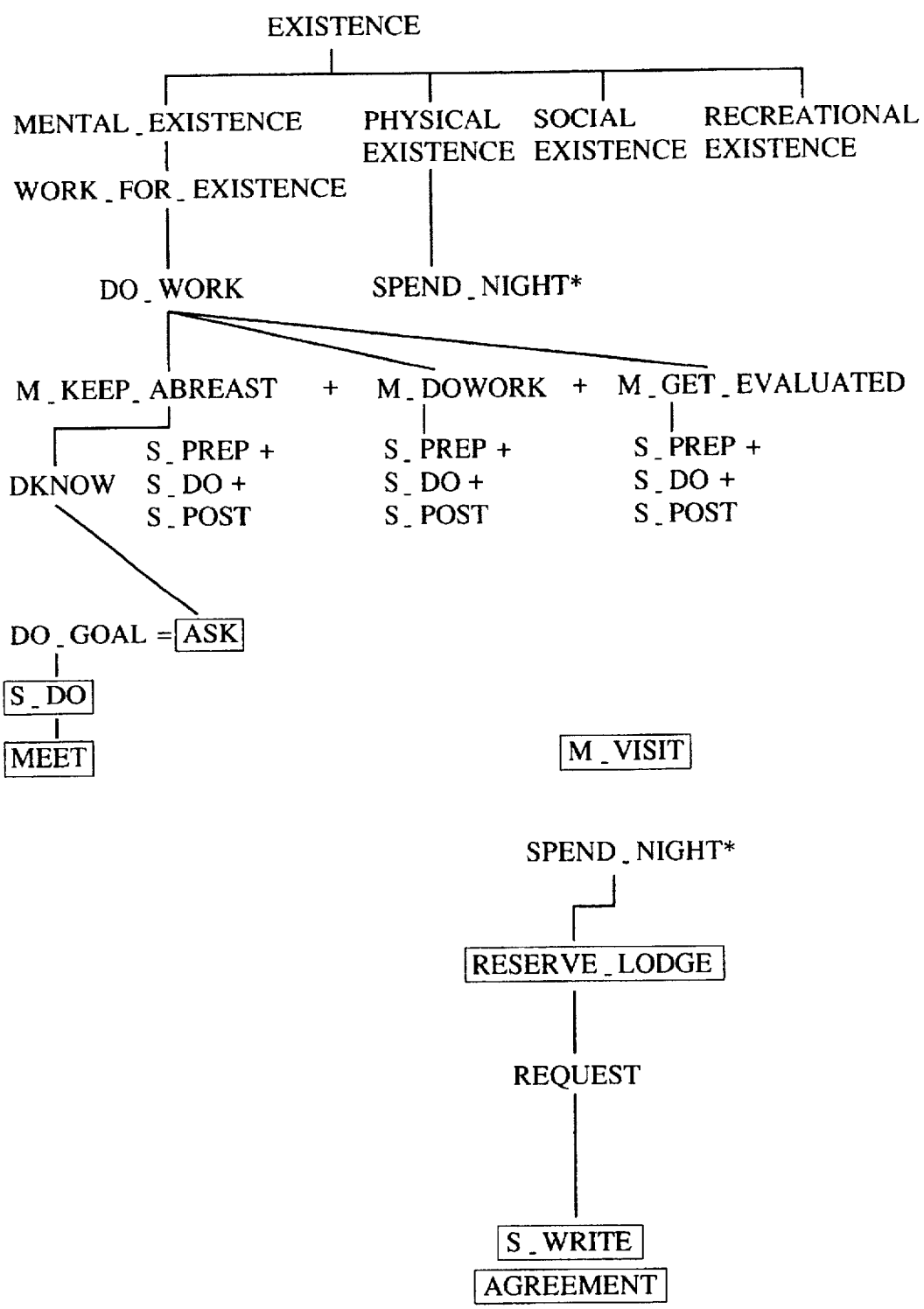
FIG. 53 is a diagram for illustrating an example of a chaining inference.

Subsequently, in step S212, goals are inferred as illustrated in FIG. 52(a). Then, in step S213, a chaining inference illustrated in FIG. 53 is performed by the process as shown in FIG. 52(b).

Figure 54:
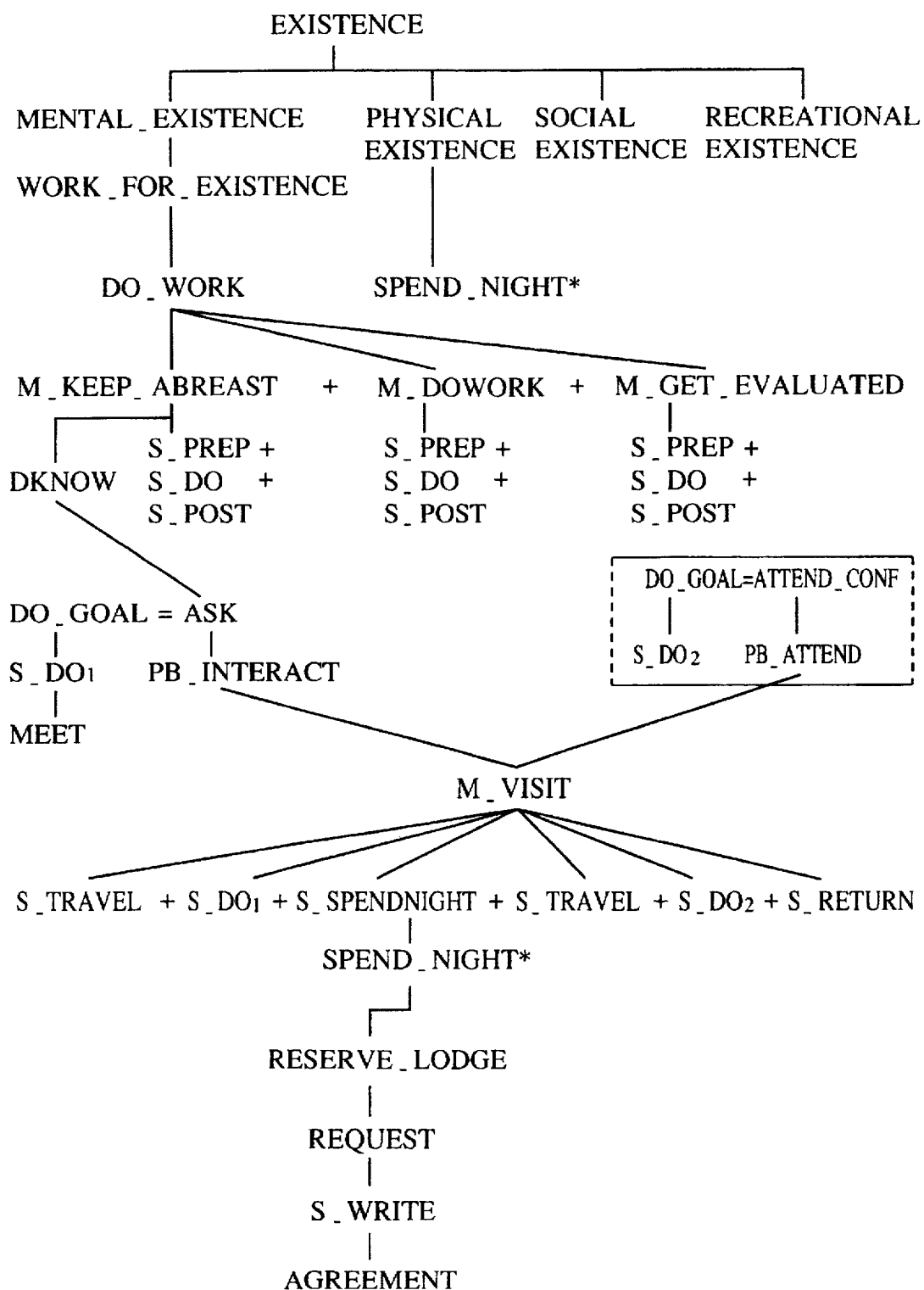
FIG. 54 is a diagram for illustrating an example of a task network.

Then, in step S214, a planning for understanding the input is made. Namely, a task network having the structure of FIG. 54 is formed. A plan "PB_INTERACT", which has a plan "M_VISIT", is obtained as that corresponding to the "ASK" by performing this process. Thus all of the input information becomes explicable.

Figure 55:
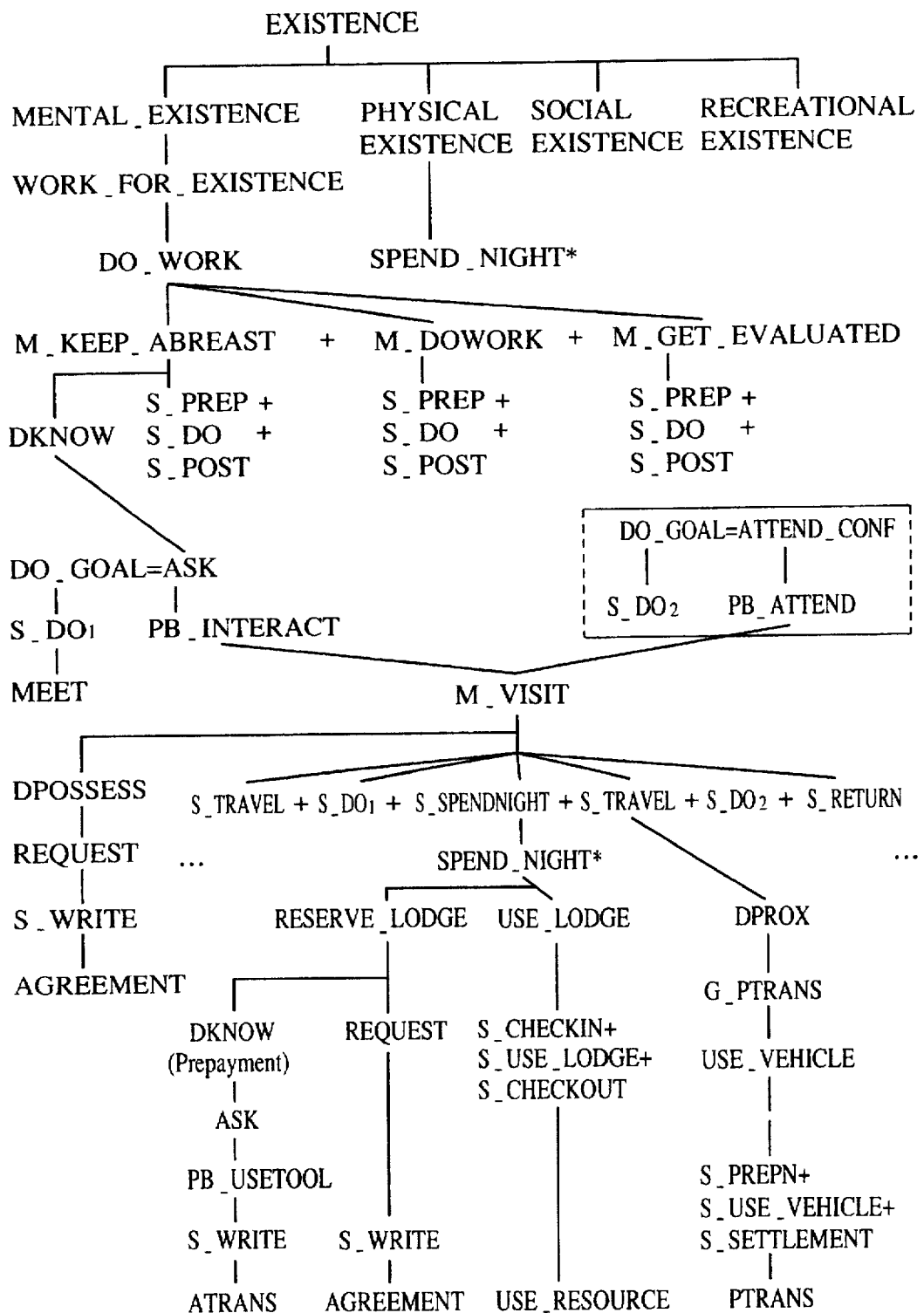
FIG. 55 is a diagram for illustrating the example of the task network after a simulation has been performed.

Next, the processing to be performed in the post-understander 93 will be described hereunder. First, in step S221, the entire task network is simulated in order to find a part of the plan, and/or any preconditions, which the user may have forgotten. As a result, the example of the task network of FIG. 55 is obtained. In this case, for instance, the plans "M_VISIT" and the "DPOSSESS (time or fix appointment)" are not explicitly stated by the user. Further, the system points out to the user that a deposit may be necessary for booking a room at a hotel.

Next, the processing to be performed by the text preparator 33 will be described hereinafter by referring to FIGS. 14 to 16.

First, in step S301, the introductory part of a text is prepared. In this case, the addressee is an unknown person and has no business relation to the sender. Therefore, the sender introduces himself in the introductory part. Thus, it becomes "I am working on Letter writing system". Information needed to prepare this part is obtained from the data base concerning the sender himself.

Next, in step S302, the main goal is described. In this case, the "ASK (discuss)" is described. Further, in step S311, the main plan is described. In this case, the "M_VISIT" is stated as a plan corresponding to the "ASK", with reference to the "ATTEND_CONF" whose plan is also the "M_VISIT".

Then, in step S312, the AD of the "AGREEMENT (fix appointment)" belonging to the plan "DPOSSESS" is stated as the precondition for the main plan. In this case, the processing to be performed in step S313 is omitted. Further, in step S314, another part of the main plan is described. Thereby, the AD of the "AGREEMENT" belonging to the "RESERVE_LODGE" is described. Further, the AD of the "ATRANS" belonging to the "DKNOW", which is a precondition, is described, if selected by the user.

Because the addressee is an unknown person, the statement "Looking forward to hearing from you." is selected in step S321 as a closing statement.

Thereafter, the processings subsequent to that to be performed by the generator 34 are carried out. As a result, the letter illustrated in FIG. 56 is output.

Next, another example of the process of preparing a letter will be described hereinbelow.

When the statement "Reply to John's letter accepting to meet on 10th May at 3 pm to discuss on PDA systems." is inputted as illustrated in FIG. 57, the CA 31 outputs the concept C1 of this figure to the understander 32 as a result of the analysis of the input statement.

In this case, the processing to be performed by the main understander 92 will be described by referring to FIG. 11, on the assumption that there are no objects to be processed by the pre-understander 91.

First, in step S211, actors contained in the information are detected. As illustrated in FIG. 58(a), in this input example, the sender is Aruna Rohra and the addressee is John Smith. Further, the kind of the letter is a reply. Moreover, it is assumed that no previous correspondence relevant to this letter exist in the data base. However, the contents of the letter can be inferred from the input information. Further, the sender expects a response and a letter from the addressee can be inferred from the concept C3 obtained from the input information.

Figure 59:
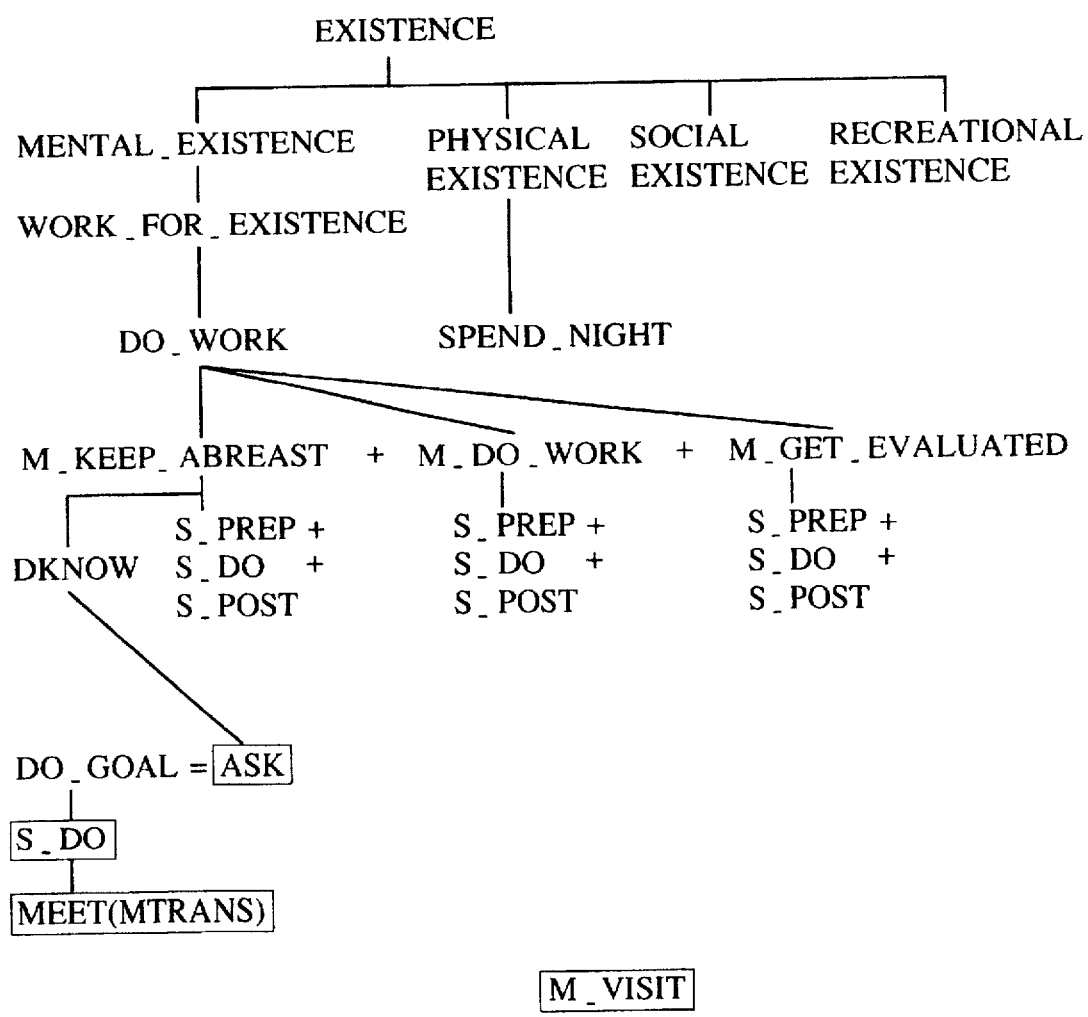
FIG. 59 is a diagram for illustrating an example of a chaining inference.
Figure 60:
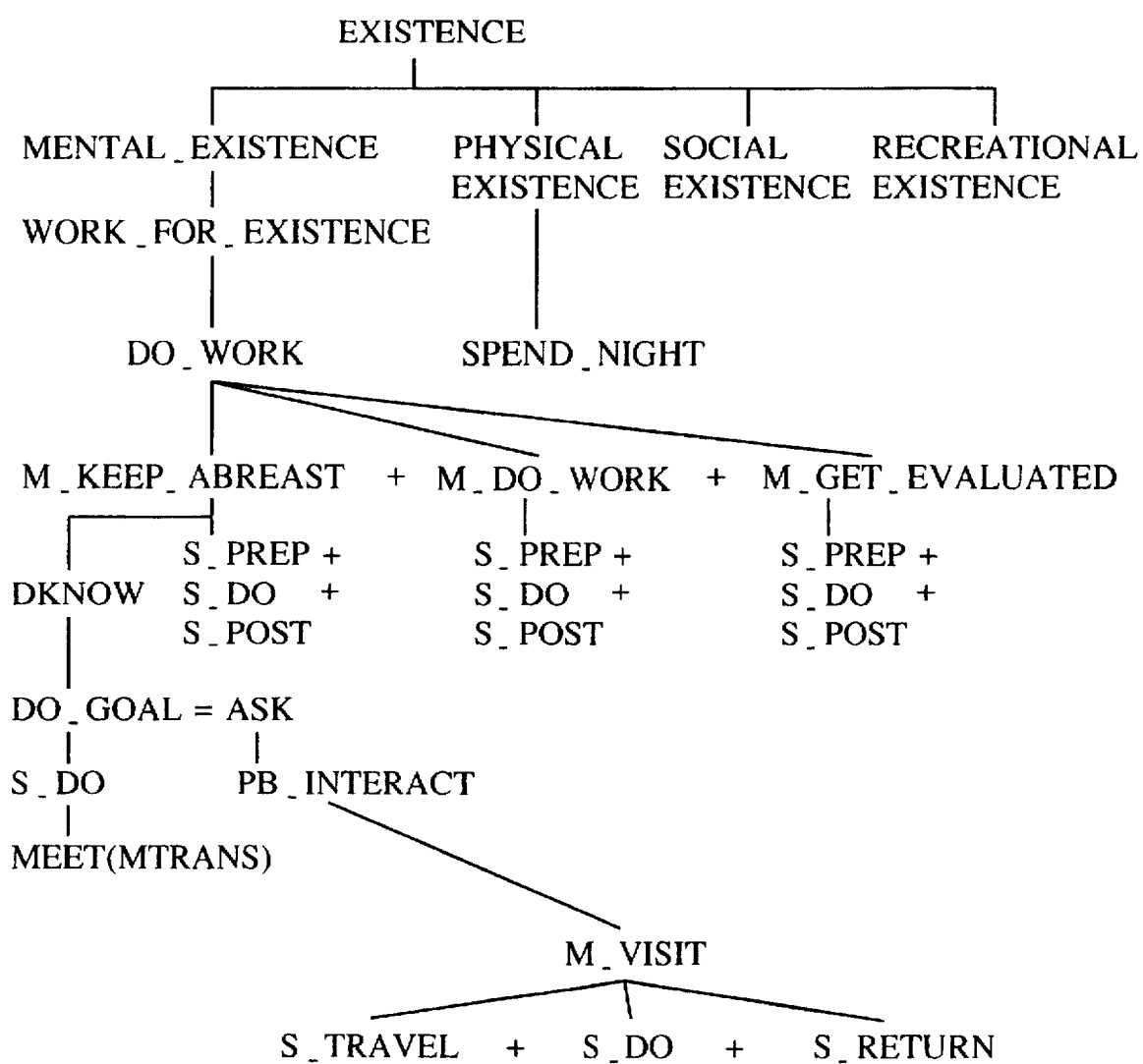
FIG. 60 is a diagram for illustrating an example of a task network.
Figure 61:
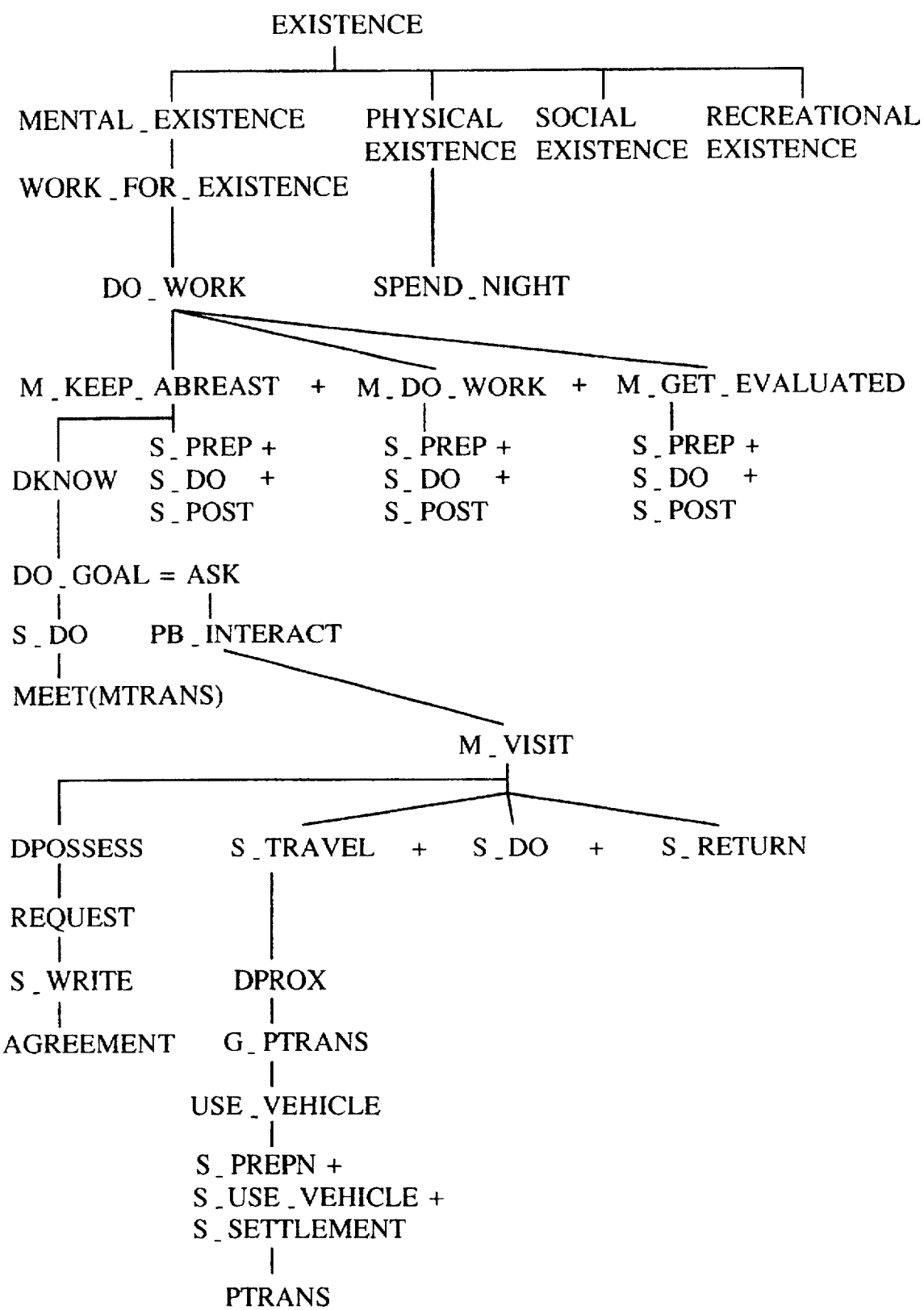
FIG. 61 is a diagram for illustrating an example of an incomplete task network.

Then, if the concept C3 is processed by performing the procedure described in FIG. 11 by means of the main understander 92, the goal is inferred in step S212 as illustrated in FIG. 58(d). Subsequently, the chaining inference of FIG. 59 is performed in step S213. Next, in step S214, planning for understanding the input letter is made. Namely, a task network having the structure of FIG. 60 is formed. Thereafter, in step S221, the missing input is made up for according to the plan of FIG. 60 by the post-understander 93. Consequently, the example of the task network of FIG. 61 can be obtained.

Thereafter, in steps S300 and S400, the letter is reconstructed from the aforementioned plans for the purpose of confirmation.

Next, the reply of the sender is inferred from the input information (or the concept C2 obtained therefrom). Corresponding to the AD of the preceding letter obtained in the aforesaid manner, the "S_MAINGOAL", which indicates that the PDA system is to discussed, is determined as an acceptable request as illustrated in FIG. 58(e). Further, the "S_MAINPLAN" indicating that the sender meet the addressee is accepted. Additionally, a more specific time, namely, "May 10th, 3 p.m." is specified correspondingly to the "S_PLAN (for example, May 8th or later)".

Thereafter, the processing similar to that performed in the case of the aforementioned example is performed. Consequently, the letter of FIG. 62 is generated.

Hereunder, still another example of a letter will be described. In the case of this example, the contents of the preceding letter can be obtained from the data base. Hereinafter, the differences between this example and the aforementioned example will be mainly described.

As illustrated in FIG. 63, when the sentence "Reply to John's letter confirming the meeting time, 19th May at 3 pm. Also, request him to arrange for pickup." are inputted, the concepts C1 and C4 are outputted from the CA 31.

The relevant previous letters are obtained in the main understander 92 from the data base. Thereby, it can be known that a visit is made after 10th May and that a response to John's letter should be made. Further, as illustrated in FIG. 64(d), the preceding letter is retrieved from the data base. Moreover, as illustrated in FIG. 64(e), the "S_MAINGOAL", which indicates that the discussion is conducted, is assumed as an acceptable request. Furthermore, the "S_MAINPLAN" indicating that people meet is accepted. These matters are inferred from the input statement ". . . confirming the meeting time, 19th May at 3 pm". Thus, the more practical date, namely, "19th May at 3 pm" is indicated correspondingly to the "S_PLAN". In addition to the reply prepared as described above, another request (namely, the request "the sender wishes to be picked up" is obtained from the input expression "request him to arrange for pickup") is added as a letter from the sender. Thereafter, the processing similar to that of the case of the aforementioned example is performed. Consequently, the letter of FIG. 65 is generated.

Hereinafter, yet another example of a letter will be described. In the case of this example, the system can not infer the addressee's letter from currently inputted information and thus requests the user to input information.

Hereunder, the differences between this example and each of the aforesaid examples will be mainly described.

As illustrated in FIG. 66, when the statement "Reply to John's letter." is inputted, the concept C1 is outputted from the CA 31.

In the main understander 92, the contents of the relevant previous letters are obtained from the data base. Further, it is known that a visit is made after 10th May. Moreover, it is confirmed by the user that John's letter should be responded. Furthermore, as illustrated in FIG. 66(d), the preceding letter is retrieved from the data base. As is seen in FIG. 66(e), nothing is specified from the currently inputted information. Thus, the system can not infer the addressee's letter, with the result that the system requests the user to input information representing the contents of this letter by means of, for example, OCR (Optical Character Reader). Then, the contents of the letter as illustrated in FIG. 66(e) is inputted to the system. Thereafter, the processing illustrated in FIG. 67 is performed similarly as in the case of the aforementioned example. Consequently, the letter of FIG. 68 is generated.

Next, an operation of preparing an example of a text of the treatise type will be described hereinbelow.

This example is a text in which predetermined elements such as a purpose and a conclusion are described by using technical terms, similarly as in the case of the specification for a patent application. In the case of describing the text of this type, a wealth of technical knowledge is required.

For instance, the details of themes and names are extracted from the data base. Further, the details of data, topics and key words are obtained from the input information. Thereby, achievements or results can be obtained.

FIG. 42(a) illustrates an example of the rules for preparing a text of this type. These rules are applied in the order as illustrated in this figure, whereby a text is prepared. As illustrated in this figure, the background of the contents of the text is introduced from reports and results obtained up to this point of time. Next, primary points of results are enumerated as purposes. Further, as achievements, the input text obtained from the user is elaborated, so that refined and rational text is obtained. Subsequently, the points of the aforementioned text are stated as a conclusion or a summary. Finally, the relevant attached papers are described if referred to in the description of the result otherwise obtained from the user.

In the foregoing description, it has been described that most of the information representing the contents of a treatise is inputted by the user. However, in the case where the system is provided with the understander 32 for understanding the user's intention from the input information, the system can easily prepare a text by utilizing the expert knowledge contained in the knowledge base and by understanding an outline inputted by the user even if the contents of a study are not inputted at all.

Next, an example of an operation of preparing a manual will be described hereinbelow.

First, in the case where the system generates a manual for a single kind of a product such as a copying machine or a word processor, the system has widespread knowledge about such a product. Therefore, the system requires only a relatively small amount of input information. Further, the system can provide a help function or facility using a natural language. Moreover, the system can prepare and update a text of a manual. Furthermore, the system can be used for translating the manual from a language into another language.

However, in the case where the system generates manuals for a plurality of products in a technical field, namely, software or office equipments, the system requires input information concerning the details of such a product. This is because of the fact that the system does not have profound understanding about each of the products. The system can perform merely the functions of summarizing and editing the manual rather than the function of preparing the manual.

Additionally, in such a case, the system can translate the manual from a language into another language ostensibly or superficially. Such a method can be achieved by a system which has no understander. These two types of techniques can be selected respectively corresponding to a case where specific knowledge concerning a single article should be contained in the knowledge base of a predetermined size, or another case where knowledge concerning many articles should be contained in the knowledge base of the predetermined size.

FIG. 69 illustrates an example of a text preparation rule for a user manual of word processor.

Figure 70:
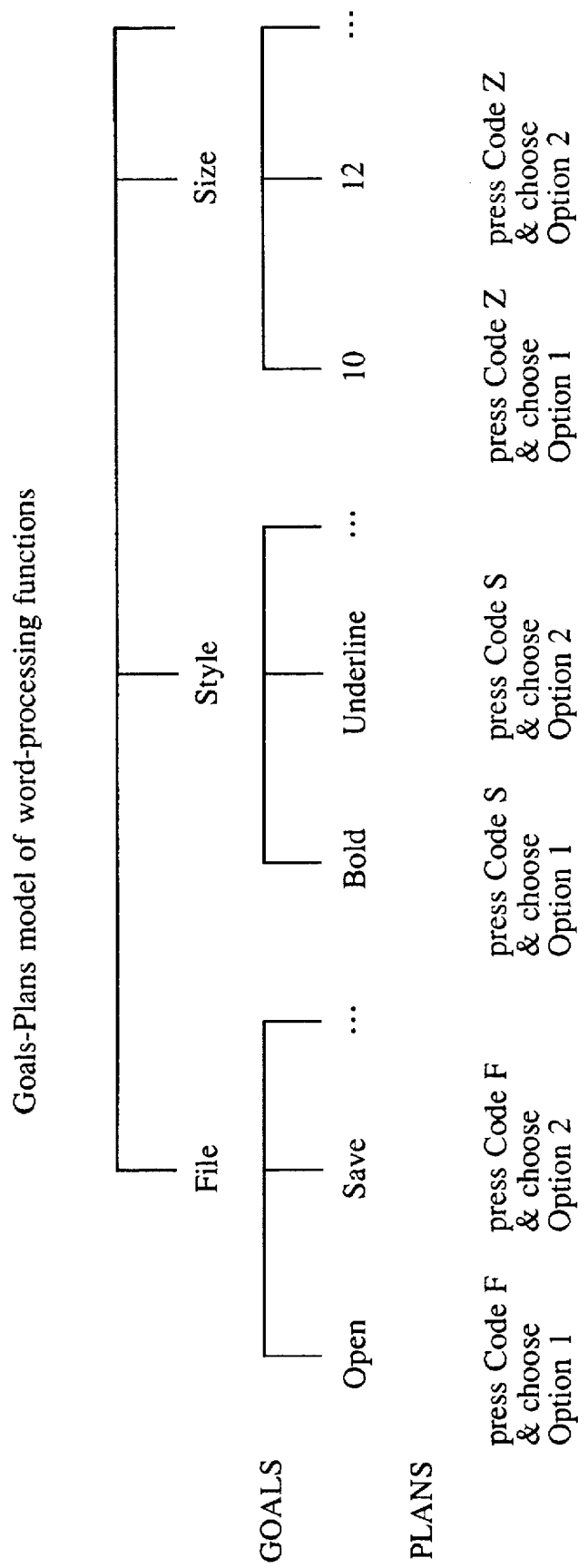
FIG. 70 is a diagram for illustrating an example of a Goals-Plans structure of a command.

Next, an example of a help facility of a word processor using a natural language will be described hereinbelow. The system may be adapted to understand a natural-language inquiry or question statement inputted by the user when utilizing the help facility. Alternatively, input information for a help facility may be inputted by simply using keys or commands. In this case, each command is modeled in such a manner as to have the goal-plan structure. An example of this structure is illustrated in FIG. 70. Further, referring to FIG. 71, there is shown an example of a reply in the case where a bold typeface and the type size of 12 points are designated. In addition to the knowledge concerning the goal-plan structure, the system needs knowledge concerning an installation procedure and a disk.

The characteristic aspect or feature of this system resides in that a list of all of plans arranged in an appropriate order is formed as a response to the requested help function. Thereby, the system can output an response sentence, which corresponds to the user and the circumstances more suitably, in comparison with the case of simply outputting a fixed sentence as a reply.

Next, an example of an operation of preparing a text according to information sent from a sub-system will be described hereunder.

When the system understands the contents of input information, the system calls a sub-system such as an expert system. Generally, an expert system is a system adapted to contain knowledge owned by an expert to deal with various situations and to offer advice according to rules provided therein. Such a sub-system offers advice by using all inference/rule-selection mechanisms.

Further, useful information is processed by the text preparing system. This system has a rule for determining what information should be contained in a text to be finally outputted, for instance, a rule for stating only important portions by describing only events, the possibilities of which are not less than 30%, and by neglecting the other events.

Thus, in the case of such a system, an information filtering, which is an operation of stating only the most closely related matters among matters to be stated, can be achieved. Further, if a user is a beginner, he may not know the technical details of such a rule. This system, then, can determine the contents of an output text according to the technical level or skill of the user.

Incidentally, as long as the functions of the system of the present invention can be performed, the system of the present invention may be of the single-unit type or of the type that consists of a plurality of composing units. Apparently, the present invention can be applied to the case where the processing is performed by providing programs to the system or unit.

As described above, the present invention has an advantage in that a high-quality text with contents and structure required for an output text can be generated by understanding a user's intention according to input information.

Especially, the present invention has another advantage in that in the case where a history of operations performed by an operator is stored, a response statement to be outputted can be generated as a statement which corresponds to the history.

Although the preferred embodiment of the present invention has been described above, it is to be understood that the present invention is not limited thereto and that other modifications will be apparent to those skilled in the art without departing from the spirit of the invention.

The scope of the present invention, therefore, is to be determined solely by the appended claims.

What is claimed is:

1. A text preparing system comprising:
   input means for inputting information;
   a knowledge base for storing knowledge including a text preparation rule which defines kinds of contents in a text and an order of the contents in the text;
   retrieval means for retrieving knowledge, which relates to the information inputted by said input means, from said knowledge base;
   collection means for collecting information corresponding to the kinds of contents defined by the text preparation rule from the information inputted by said input means and the knowledge retrieved by said retrieval means;
   order determining means for determining a describing order of the information collected by said collection means in accordance with the order of the contents in the text defined by the text preparation rule; and
   generating means for generating the text containing the information collected by said collection means in the describing order determined by said order determining means.

2. The text preparing system according to claim 1, wherein said knowledge base has knowledge relating to a reader of a text to be generated by said generating means, wherein said collection means collects information corresponding to the kinds of contents defined by the text preparation rule, on the basis of the knowledge relating to the reader of the text.

3. The text preparing system according to claim 2, wherein said knowledge base stores a level of the reader's understanding therein as the knowledge relating to the reader of the text.

4. The text preparing system according to claim 2, wherein said knowledge base stores a relation between an author and the reader of the text therein as the knowledge relating to the reader of the text.

5. The text preparing system according to claim 4, wherein the relation includes a difference in social position between the author and the reader of the text therein as the knowledge relating to the reader of the text.

6. The text preparing system according to claim 4, wherein a text to be generated by said generating means is a letter, wherein the relation between the author and the reader includes information relating to precedent correspondence between a sender and a receiver of the letter.

7. The text preparing system according to claim 6, wherein said knowledge base stores a text preparation rule in accordance with the precedent correspondence between the sender and the receiver.

8. The text preparing system according to claim 7, wherein the text preparation rule depends on absence of the precedent correspondence between the sender and the receiver.

9. The text preparing system according to claim 7, wherein the text preparation rule includes a text preparation rule that depends on a frequency of the precedent correspondence between the sender and the receiver.

10. The text preparing system according to claim 7, wherein the text preparation rule includes a text preparation rule that depends on the latest correspondence between the sender and the receiver.

11. The text preparing system according to claim 7, wherein the text preparation rule includes a text preparation rule that depends on whether or not the letter to be generated is a reply to a letter from the receiver.

12. The text preparing system according to claim 4, wherein a text to be generated by said generating means is a letter and wherein the relation between the author and the reader includes a closeness between a sender and a receiver of the letter.

13. The text preparing system according to claim 1, wherein said knowledge base has knowledge relating to a reader of a text to be generated by the generating means, wherein said order determining means determines the describing order of the information collected by said collecting means in accordance with the order of the contents in the text defined by the text preparation rule, on the basis of the knowledge relating to the reader of the text.

14. The text preparing system according to claim 13, wherein said knowledge base stores a level of the reader's understanding therein as the knowledge relating to the reader of the text.

15. The text preparing system according to claim 13, wherein said knowledge base stores a relation between an author and the reader of the text therein as the knowledge relating to the reader of the text.

16. The text preparing system according to claim 15, wherein the relation includes a difference in social position between the author and the reader of the text therein as the knowledge relating to the reader of the text.

17. The text preparing system according to claim 1, wherein said knowledge base has knowledge relating to a document type of a text to be generated by said generating means, wherein said collection means collects information corresponding to the kinds of contents defined by the text preparation rule on the basis of the knowledge relating to the document type of the text.

18. The text preparing system according to claim 1, wherein said knowledge base has knowledge relating to a document type of a text to be generated by the generating means, wherein said order determining means determines the describing order of the information collected by said collection means in accordance with the order of the contents in the text defined by the text preparation rule, on the basis of the knowledge relating to the document type of the text.

19. The text preparing system according to claim 1, wherein said knowledge base includes knowledge relating to a document type and a tone of a text to be generated by said generating means and wherein said generating means generates the text in the tone corresponding to the document type of the text on the basis of the knowledge relating to the document type and the tone of the text.

20. A text preparing system comprising:
input means for inputting information;
a knowledge base for storing knowledge including a text preparation rule which defines kinds of contents in a text and an order of the contents in the text;
understanding means for retrieving knowledge, which relates to the information inputted by said input means, from said knowledge base, for understanding a user's intention and for outputting information which relates to a text to be generated;
collection means for collecting information corresponding to the kinds of contents defined by the text preparation rule, from the information outputted by said understanding means;
order determining means for determining a describing order of the information collected by said collecting means in accordance with the order of the contents in the text defined by the text preparation rule; and
generating means for generating the text containing the information collected by said collection means in the describing order determined by said order determining means.

21. The text preparing system according to claim 20, wherein said input means inputs information represented in a natural language, wherein said understanding means has analysis means for analyzing a concept corresponding to the information inputted and represented in the natural language.

22. The text preparing system according to claim 20, wherein said knowledge base stores a history of operations performed by an operator of the system therein.

23. The text preparing system according to claim 20, wherein said knowledge base includes goal-plan knowledge relating to a goal and a plan and wherein said understanding means retrieves the goal-plan knowledge relating to the inputted information and understands the user's intention on the basis of the retrieved goal-plan knowledge.

24. The text preparing system according to claim 23, wherein said understanding means infers a main goal of the letter and a main plan for the goal on the basis of the retrieved goal-plan knowledge.

25. The text preparing system according to claim 23, wherein the main goal and the main plan are included in the information collected by said collection means.

26. The text preparing system according to claim 25, wherein said order determining means determines the describing order of the information in order of the main goal, the main plan and other information.

27. The text preparing system according to claim 26, wherein the other information includes a sub goal.

28. A text preparing system comprising:
input means for inputting information;
a knowledge base for storing knowledge therein, said knowledge base stores a history of an operation of requesting a same text performed by an operator of the system;
understanding means for retrieving knowledge, which relates to the information input by said input means, from said knowledge base, for understanding a user's intention and for outputting information which relates to a text to be generated;
selection means for selecting information, which should be used as an element of a text to be prepared, from the information outputted by said understanding means;
order determining means for determining a describing order in which the information selected by said selection means is described; and
generating means for generating the text, which should be outputted from the information which is selected by said selection means and has the describing order determined by said order determining means,
wherein said selection means refers to the history and selects an abundance of information correspondingly to a first request as information to be used as elements of the text but selects simple information correspondingly to a second request or later requests as the information to be used as the elements of the text.

29. A text preparing method comprising the steps of:
inputting information;
retrieving information relating to the inputted information from a knowledge base for storing knowledge including a text preparation rule which defines kinds of contents in a text and an order of the contents in the text;
collecting information corresponding to the kinds of contents defined by the text preparation rule, from the inputted information and the retrieved knowledge;
determining a describing order of the information collected in said collection step in accordance with the order of the contents in the text defined by the text preparation rule; and
generating a text containing the collected information in the describing order determined.

30. The text preparing method according to claim 29, wherein the knowledge base has knowledge relating to a reader of a text to be generated in said generating step, wherein in said collection step, the information corresponding to the kinds of contents defined by the text preparation rule, is collected on the basis of the knowledge relating to the reader of the text.

31. The text preparing method according to claim 30, wherein the knowledge relating to the reader of the text includes a level of the reader's understanding.

32. The text preparing method according to claim 30, wherein the knowledge relating to the reader of the text includes a relation between an author and the reader of the text.

33. The text preparing method according to claim 32, wherein the knowledge relating to the reader of the text includes a difference in social position between the author and the reader of the text.

34. The text preparing method according to claim 32, wherein a text to be generated in said generating step is a letter and wherein the relation between the author and the reader includes information relating to precedent correspondence between a sender and a receiver of the letter.

35. The text preparing method according to claim 34, wherein said knowledge base stores a text preparation rule in accordance with the precedent correspondence between the sender and the receiver.

36. The text preparing method according to claim 35, wherein the text preparation rule depends on absence of the precedent correspondence between the sender and the receiver.

37. The text preparing method according to claim 35, wherein the text preparation rule includes a text preparation rule that depends on a frequency of the precedent correspondence between the sender and the receiver.

38. The text preparing method according to claim 35, wherein the text preparation rule includes a text preparation rule that depends on the latest correspondence between the sender and the receiver.

39. The text preparing method according to claim 35, wherein the text preparation rule includes a text preparation rule that depends on whether or not the letter to be generated is a reply to a letter from the receiver.

40. The text preparing method according to claim 32, wherein a text to be generated in said generating step is a letter and wherein the relation between the author and the reader includes a closeness between a sender and a receiver of the letter.

41. The text preparing method according to claim 29, wherein the knowledge base has knowledge relating to a reader of a text to be generated in said generating step, wherein in said determining step, the describing order of the information collected in said collection step in accordance with the order of the contents in the text defined by the text preparation rule, is determined on the basis of the knowledge relating to the reader of the text.

42. The text preparing method according to claim 41, wherein the knowledge base stores a level of the reader's understanding therein as the knowledge relating to the reader of the text.

43. The text preparing method according to claim 41, wherein the knowledge base stores a relation between an author and the reader of the text therein as the knowledge relating to the reader of the text.

44. The text preparing method according to claim 43, wherein the relation includes a difference in social position between the author and the reader of the text therein.

45. The text preparing method according to claim 29 wherein the knowledge base has knowledge relating to a document type of a text to be generated in said generating step, wherein in said collection step information corresponding to the kinds of contents defined by the text preparation rule is collected on the basis of the knowledge relating to the reader of the text.

46. The text preparing method according to claim 29, wherein the knowledge base has knowledge relating to a document type of a text to be generated in said generating step, wherein in said order determining step, the describing order collected in said collection step in accordance with the order of the contents in the text defined by the text preparation rule, is determined on the basis of the knowledge relating to the document type of the text.

47. The text preparing method according to claim 29, wherein the knowledge base includes knowledge relating to a document type and a tone of a text to be generated in said generating step and wherein in said generating step the text is generated in the tone corresponding to the document type of the text on the basis of the knowledge relating to the document type and the tone of the text.

48. A text preparing method comprising the steps of:
inputting information;
understanding a user's intention by retrieving information relating to the inputted information from a knowledge base for storing knowledge including a text preparation rule which defines kinds of contents in a text and an order of the contents in the text;
outputting information relating to a text according to the understood intention;
collecting information corresponding to the kinds of contents defined by the text preparation rule, from the outputted information;
determining a describing order of the collected information in accordance with the order of the contents in the text defined by the text preparation rule; and
generating a text containing the collected information in the describing order determined.

49. The text preparing method according to claim 48, wherein in the inputting step information is represented in a natural language, wherein the step of understanding the user's intention has the sub-step of analyzing a concept corresponding to the information inputted and represented in the natural language.

50. The text preparing method according to claim 48, wherein the knowledge base stores a history of operations performed by an operator of a system for preparing the text.

51. The text preparing method according to claim 48, wherein the knowledge base includes goal-plan knowledge relating to a goal and a plan and wherein in said understanding step the goal-plan knowledge relating to the inputted information is retrieved and the user's intention is understood on the basis of the retrieved goal-plan knowledge.

52. The text preparing method according to claim 51, wherein in said understanding step a main goal of the letter and a main plan for the goal are inferred on the basis of the retrieved goal-plan knowledge.

53. The text preparing method according to claim 51, wherein the main goal and the main plan are included in the information collected in said collection step.

54. The text preparing method according to claim 53, wherein in said order determining step the describing order of the information is determined in order of the main goal, the main plan and other information.

55. The text preparing method according to claim 54, wherein the other information includes a sub goal.

56. A text preparing method comprising the steps of:

inputting information;

understanding a user's intention by retrieving information relating to the inputted information from a knowledge base for storing knowledge;

outputting information relating to a text, which should be generated, according to the understood intention;

selecting information, which should be used as an element of the text to be generated, from the outputted information;

determining an order in which the selected information is described; and generating a text, which should be outputted, from the information which is selected and has the describing order determined, wherein the knowledge base stores a history of an operation of requesting a same text performed by an operator, wherein in said step of selecting information, the history is referred to, and an abundance of information is selected correspondingly to a first request as information to be used as elements of the text but simple information is selected correspondingly to a second request or later requests as the information to be used as the elements of the text.

57. A computer-readable storage medium storing a text preparing program for controlling a computer to prepare a text, said program comprising codes for causing the computer to perform the steps of:

inputting information;

retrieving information relating to the inputted information from a knowledge base for storing knowledge including a text preparation rule which defines kinds of contents in a text and an order of the contents in the text;

collecting information corresponding to the kinds of contents defined by the text preparation rule, from the inputted information and the retrieved knowledge;

determining a describing order of the information collected in said collection step in accordance with the order of the contents in the text defined by the text preparation rule; and generating a text containing the collected information in the describing order determined.

58. A computer-readable storage medium storing a text preparing program for controlling a computer to prepare a text, said program comprising codes for causing the computer to perform the steps of:

inputting information;

understanding a user's intention by retrieving information relating to the inputted information from a knowledge base for storing knowledge including a text preparation rule which defines kinds of contents in a text and an order of the contents in the text;

outputting information relating to a text according to the understood intention;

collecting information corresponding to the kinds of contents defined by the text preparation rule, from the outputted information;

determining a describing order of the collected information in accordance with the order of the contents in the text defined by the text preparation rule; and generating a text containing the collected information in the describing order determined.

* * * * *

UNITED STATES PATENT AND TRADEMARK OFFICE
CERTIFICATE OF CORRECTION

PATENT NO.   : 5,802,504
DATED        : September 1, 1998
INVENTOR(S)  : Aruna Rohra Suda et al It is certified that error appears in the above-identified patent and that said Letters Patent is hereby corrected as shown below:

On the title page: Item [56] Reference Cited:

Foreign Patent Documents:

"02297162" should read --02-297162--.

COLUMN 10

Line 14, "forgot" should read --forgotten--;
Line 43, "a" (first occurrence) should read --an--.

COLUMN 12

Line 24, "modifys the demon has modified the concept, the" should be deleted;
Line 25, "concept of the" should be deleted.

COLUMN 19

Line 29, "an" should read --a--.

Signed and Sealed this

Seventeenth Day of August, 1999

Attest:

Q. TODD DICKINSON

*Attesting Officer*            *Acting Commissioner of Patents and Trademarks*